US012720246B2

(12) United States Patent
Tsuchiya et al.

(10) Patent No.: US 12,720,246 B2
(45) Date of Patent: Aug. 25, 2026

(54) SOUND OUTPUT DEVICE

(71) Applicant: SONY GROUP CORPORATION, Tokyo (JP)

(72) Inventors: Ryo Tsuchiya, Tokyo (JP); Takayuki Horikiri, Tokyo (JP); Daisuke Matsuo, Tokyo (JP); Kento Oomori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 197 days.

(21) Appl. No.: 18/707,641

(22) PCT Filed: Sep. 1, 2022

(86) PCT No.: PCT/JP2022/033021
§ 371 (c)(1),
(2) Date: May 6, 2024

(87) PCT Pub. No.: WO2023/084886
PCT Pub. Date: May 19, 2023

(65) Prior Publication Data
US 2026/0164157 A1 Jun. 11, 2026

(30) Foreign Application Priority Data
Nov. 12, 2021 (JP) ................................ 2021-184884

(51) Int. Cl.
*H04R 1/06* (2006.01)
*H04R 1/10* (2026.01)

(52) U.S. Cl.
CPC ............ *H04R 1/06* (2013.01); *H04R 1/1041* (2013.01); *H04R 1/1016* (2013.01); *H04R 2420/07* (2013.01)

(58) Field of Classification Search
CPC ...... H04R 1/06; H04R 1/1041; H04R 1/1016; H04R 2420/07
(Continued)

(56) References Cited

U.S. PATENT DOCUMENTS 6,373,942 B1 4/2002 Braund
8,565,457 B2 * 10/2013 Polinske ............. H04R 25/604 381/322

(Continued)

FOREIGN PATENT DOCUMENTS

JP 2013-219476 A 10/2013
JP 5824404 B2 11/2015
WO 2021/039171 A1 3/2021

OTHER PUBLICATIONS

International Search Report and Written Opinion of PCT Application No. PCT/JP2022/033021, issued on Nov. 22, 2022, 08 pages of ISRWO.

*Primary Examiner* — Xu Mei
(74) *Attorney, Agent, or Firm* — CHIP LAW GROUP

(57) ABSTRACT

A housing including an arrangement space therein and in which an insertion hole communicating with the arrangement space is formed; a control circuit board arranged in the arrangement space; an operation button including a pressed portion having a front surface formed as a pressed surface to be pressed when the operation button is operated and an engagement protrusion protruding from the pressed portion and inserted into the insertion hole; and a flexible printed wiring board on which an antenna pattern is formed are provided, and the flexible printed wiring board is attached to a back surface of the pressed portion.

19 Claims, 15 Drawing Sheets

(58) Field of Classification Search
USPC .......................... 381/312–331, 380, 128–137
See application file for complete search history.

(56) References Cited

U.S. PATENT DOCUMENTS

| | | | | |
|---|---|---|---|---|
| 9,722,306 | B2 * | 8/2017 | Sø | H01Q 1/24 |
| 9,877,119 | B2 * | 1/2018 | Ozden | H04R 25/554 |
| 10,827,249 | B1 | 11/2020 | Pine et al. | |
| 11,582,567 | B2 * | 2/2023 | Kvist | H04R 25/609 |
| 12,348,922 | B2 * | 7/2025 | Mihara | H04R 1/02 |
| 12,355,142 | B2 * | 7/2025 | Han | H01Q 1/273 |
| 12,456,800 | B2 * | 10/2025 | Lee | H01Q 1/273 |
| 2008/0166001 | A1 * | 7/2008 | Hankey | H04R 1/083 381/364 |
| 2017/0064830 | A1 | 3/2017 | Jiang et al. | |
| 2017/0195767 | A1 | 7/2017 | Kim et al. | |
| 2020/0100036 | A1 * | 3/2020 | Kvist | H01Q 1/38 |

* cited by examiner

SOUND OUTPUT DEVICE

CROSS REFERENCE TO RELATED APPLICATIONS

This application is a U.S. National Phase of International Patent Application No. PCT/JP2022/033021 filed on Sep. 1, 2022, which claims priority benefit of Japanese Patent Application No. JP 2021-184884 filed in the Japan Patent Office on Nov. 12, 2021. Each of the above-referenced applications is hereby incorporated herein by reference in its entirety.

TECHNICAL FIELD

The present technology relates to a technical field of a sound output device that is used to output sound while being worn on ears.

BACKGROUND ART

There is sound output devices that are worn on ears for use as headphones, earphones, or the like and output sound from speakers. In recent years, cases in which the sound output devices are used outdoors are also increasing in addition to cases where the sound output devices are used indoors. In the sound output devices, speakers that output sound, a control circuit board that controls driving of the speakers and the like, and other components are disposed.

Examples of such a sound output device include a sound output device including an antenna that transmits and receives wireless signals, and is configured such that an operation button is supported by a housing, and a predetermined function is performed when the operation button is pressed (see, for example, Patent Document 1).

The sound output device described in Patent Document 1 is configured such that an operation unit returns to the original state by the biasing force of the coil spring when the pressing operation on the operation unit is released, and the coil spring has conductivity to be also used as an antenna.

CITATION LIST

Patent Document

Patent Document 1: Japanese Patent No. 5824404

SUMMARY OF THE INVENTION

Problems to be Solved by the Invention

Meanwhile, the sound output device as described above is configured to include an operation button and an antenna, increasing the functionality accordingly, but increasing the number of parts, and there is a possibility that downsizing is hindered. In particular, the sound output device is desirable to have a portion protruding from the ear that is small as much as possible in a state of being worn on the ear, and desirable to have a less thickness.

On the other hand, since the antenna has a function of transmitting and receiving signals, the antenna needs to be positioned at a certain distance or more from the control circuit board in order to avoid affection of noise that may occur in the control circuit board and then ensure high functionality.

Accordingly, an object of a sound output device of the present technology is to have a small size while securing its high functionality.

Solutions to Problems

A sound output device according to the present technology includes: a housing including an arrangement space therein and in which an insertion hole communicating with the arrangement space is formed; a control circuit board arranged in the arrangement space; an operation button including a pressed portion having a front surface formed as a pressed surface to be pressed when the operation button is operated and an engagement protrusion protruding from the pressed portion and inserted into the insertion hole; and a flexible printed wiring board on which an antenna pattern is formed, in which the flexible printed wiring board is attached to a back surface of the pressed portion.

With this configuration, there is no space between the pressed portion of the operation button and the antenna pattern, and the distance between the control circuit board and the pressed portion can be reduced in a state where the control circuit board and the antenna pattern are separated from each other by a certain distance or more.

Another sound output device according to the present technology includes: a housing including an arrangement space therein and in which an insertion hole communicating with the arrangement space is formed; a control circuit board arranged in the arrangement space; and an operation button including a pressed portion having a front surface formed as a pressed surface to be pressed when the operation button is operated and an engagement protrusion protruding from the pressed portion and inserted into the insertion hole, in which an antenna pattern is formed on at least a back surface of the pressed portion.

With this configuration, there is no space between the pressed portion of the operation button and the antenna pattern, and the distance between the control circuit board and the pressed portion can be reduced in a state where the control circuit board and the antenna pattern are separated from each other by a certain distance or more.

MODE FOR CARRYING OUT THE INVENTION

Hereinafter, a mode for embodying the sound output device according to the present technology will be described with reference to the accompanying drawings. The sound output device of the present technology is used as an earphone or a headphone. However, the sound output device of the present technology can be particularly applied to a hearing aid and the like in addition to a truly wireless earphone and an overhead headphone.

Note that the sound output device described below is provided with a speaker that functions as a sound output unit and a sound conduit in which an internal space is formed as a sound path (sound guiding space) for sound output from the speaker. In the following description, when a direction is indicated, the front-rear, up-down, and left-right directions are referred to with the axial direction of the sound conduit defined as the left-right direction.

However, the front, rear, upper, lower, left, and right directions described below are for convenience of description, and implementation of the present technology is not limited to these directions.

<Configuration of Sound Output Device According to First Embodiment>

First, a configuration of a sound output device 1 according to a first embodiment will be described (see FIGS. 1 to 8).

The sound output devices 1 are used, for example, as a pair, one for the left ear and the other for the right ear. However, only one sound output device 1 may be used to hear sound.

Figure 1:
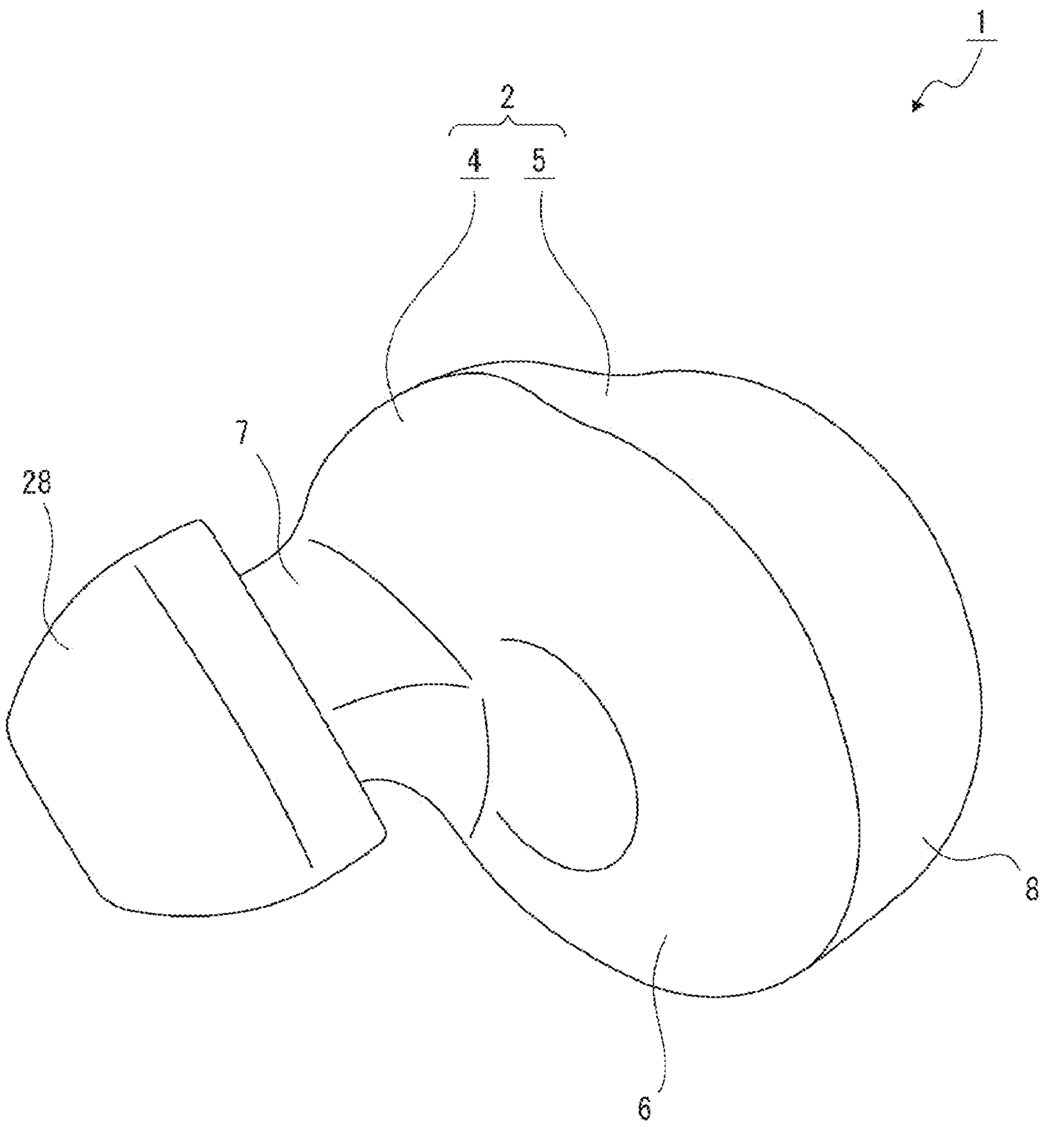
FIG. 1 illustrates a first embodiment of a sound output device of the present technology together with FIGS. 2 to 8, and this figure is a perspective view of the sound output device.
Figure 2:
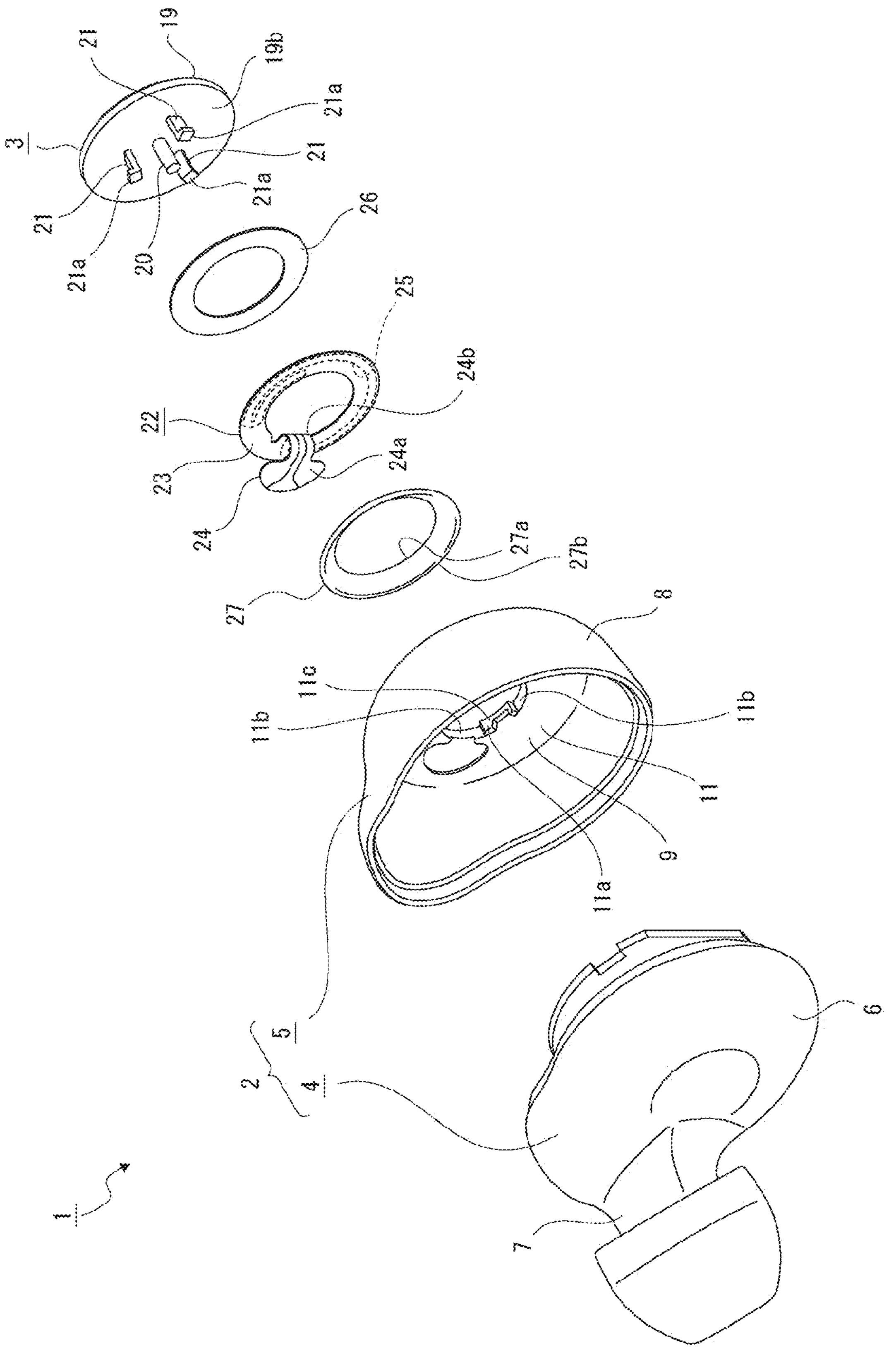
FIG. 2 is an exploded perspective view of the sound output device.
Figure 3:
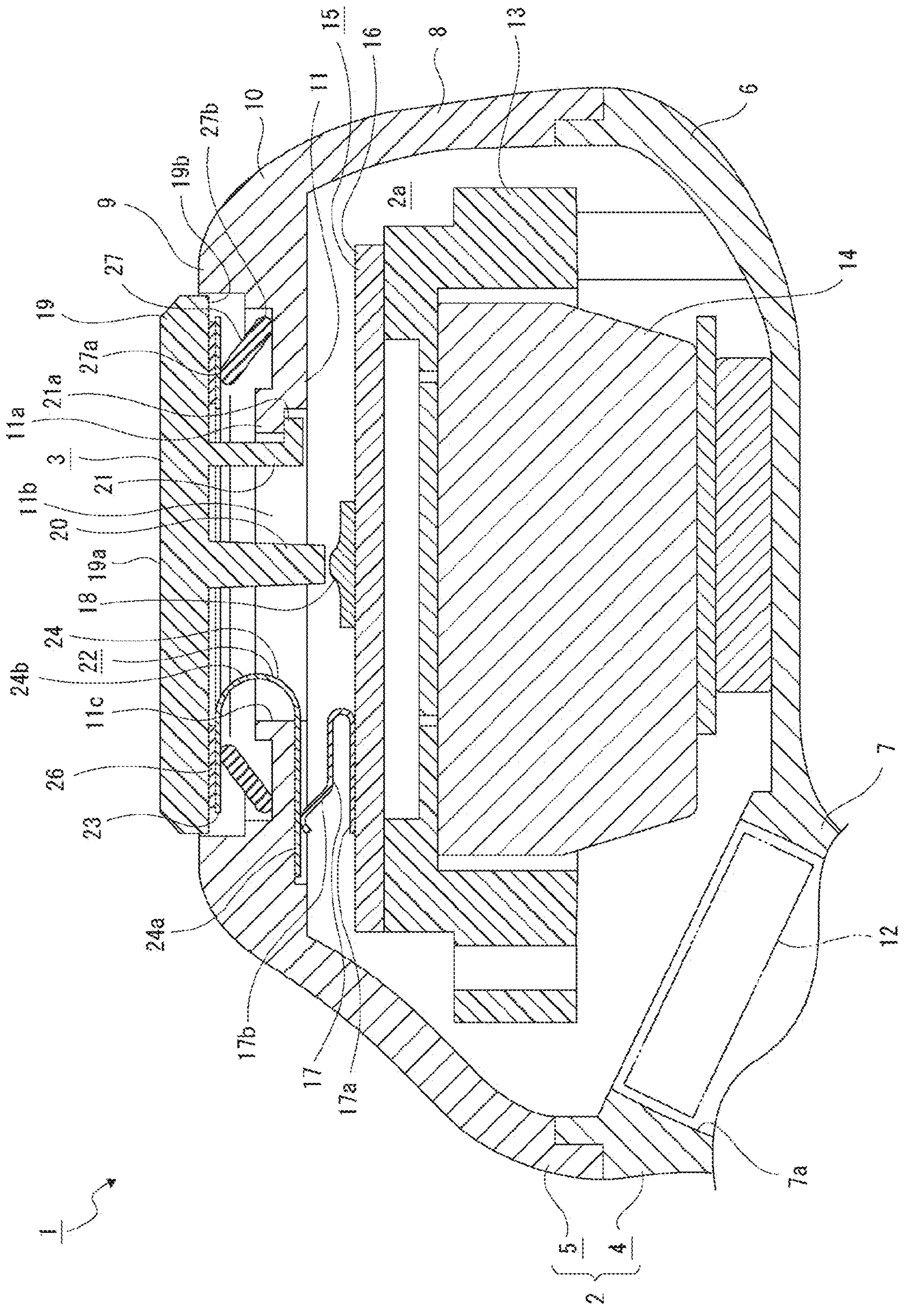
FIG. 3 is a cross-sectional view of the sound output device.

The sound output device 1 includes a housing 2 provided as an outer casing, required units arranged inside the housing 2, and an operation button 3 supported by the housing 2 (see FIGS. 1 to 3).

The housing 2 is configured by coupling a first case 4 and a second case 5 in the left-right direction.

The first case 4 is formed by integrally forming a shallow dish-shaped case portion 6 opened to one side in the left-right direction and a sound conduit 7 protruding from the case portion 6 to the other side in the left-right direction. The entire outer surface of the case portion 6 is formed in a convex curved shape protruding outward. The sound conduit 7 is formed in a substantially cylindrical shape with its axial direction in substantially the left-right direction, and an internal space thereof is formed as a sound guiding space 7*a*. The sound guiding space 7*a* communicates with a space inside the case portion 6.

The second case 5 is formed in a shape having a recess opened on a side opposite to the first case 4, and includes a peripheral surface portion 8 formed in a tubular shape and a button arrangement portion 9 formed continuously from one end portion of the peripheral surface portion 8 in the axial direction. The entire outer surface of the peripheral surface portion 8 is formed in a curved shape. The button arrangement portion 9 has an annular peripheral portion 10 formed continuously from the peripheral surface portion 8 and an overhanging portion 11 that overhangs inward from an end portion of the peripheral portion 10 on the peripheral surface portion 8 side. A plurality of restricting protrusions 11*a* is provided on the inner peripheral portion of the overhanging portion 11 while spaced apart from each other in the circumferential direction. In the space inside the overhanging portion 11, portions between the restricting protrusions 11*a* adjacent to each other in the circumferential direction are formed as respective insertion cutouts 11*b*. The entire space inside the overhanging portion 11 including the insertion cutouts 11*b* is formed as an insertion hole 11*c*.

The housing 2 is configured such that the case portion 6 of the first case 4 and the peripheral surface portion 8 of the second case 5 abut against each other and coupled (see FIG. 1). In the space inside the housing 2, a portion excluding the sound guiding space 7*a* is formed as an arrangement space 2*a* (see FIG. 3).

Inside the sound conduit 7, a speaker 12 is disposed at an end portion on the side of the arrangement space 2*a*. The sound output from the speaker 12 is emitted toward the outside through the sound conduit 7.

In the arrangement space 2*a*, a board attachment member 13 is disposed. The board attachment member 13 has a portion formed in a substantially cylindrical shape. Inside the board attachment member 13, a battery 14 is disposed, and at one end portion of the board attachment member 13, a control circuit board 15 is attached.

The control circuit board 15 is arranged on the overhanging portion 11 side in the arrangement space 2*a*, and an outer peripheral portion of the control circuit board 15 faces the overhanging portion 11. The control circuit board 15 includes, for example, a disk-shaped board 16, various electronic components (not illustrated) mounted on the board 16, and a spring terminal 17 connected to a circuit pattern (not illustrated) on the board 16. The spring terminal 17 functions as a connection terminal to which an antenna pattern as described later is connected, and includes a joining portion 17*a* joined to the circuit pattern and a plate-shaped elastic deformation portion 17*b*. The spring terminal 17 is mounted on a surface of the board 16 on a side facing the overhanging portion 11. In a central portion of the board 16, a switch 18 is mounted on a surface of the board 16 on a side facing the overhanging portion 11.

The operation button 3 is formed by integrally forming a disk-shaped pressed portion 19, an operation shaft 20 protruding from a center portion of the pressed portion 19 in the thickness direction of the pressed portion 19, and a plurality of engagement protrusions 21 protruding from the pressed portion 19 (see FIGS. 1 to 3). The pressed portion 19 has one surface in the thickness direction formed as a pressed surface 19*a* to be pressed when the operation button 3 is operated, and the other surface in the thickness direction formed as a facing surface 19*b*. Both the operation shaft 20 and the engagement protrusions 21 protrude from the facing surface 19*b*, and the engagement protrusions 21 protrude from positions around the operation shaft 20 in the same direction as the direction in which the operation shaft 20 protrudes. The engagement protrusions 21 are provided as restricted protrusions 21*a* with their tip end portions bent outward with respect to the other portions.

A flexible printed wiring board 22 is attached to the operation button 3. The flexible printed wiring board 22 has an annular attached portion 23 and a lead-out portion 24 protruding from the attached portion 23, and the lead-out portion 24 protrudes from the inner periphery of the attached portion 23. The lead-out portion 24 includes a tip end portion provided as a connection portion 24*a* and the other portion provided as a bent portion 24*b*. The bent portion 24*b* is bent in the thickness direction, and is, for example, bent back to have a U shape.

On the flexible printed wiring board 22, an antenna pattern 25 is formed. The antenna pattern 25 is formed at a position extending from the attached portion 23 to the lead-out portion 24. The antenna pattern 25 functions as an antenna, and acoustic signals are transmitted and received by the antenna pattern 25.

The flexible printed wiring board 22 is attached to the operation button 3 by adhesion of the attached portion 23 to the facing surface 19*b* with an adhesive material 26 such as a double-sided tape, for example.

The operation button 3 is supported by the housing 2 such that the operation button 3 is movable in the axial direction of the operation shaft 20. The operation button 3 is supported by the housing 2 by being rotated about the axis by a predetermined angle with respect to the second case 5 in a state where the engagement protrusions 21 are inserted into the respective insertion cutouts 11*b* in the second case 5 and the operation shaft 20 is inserted into the insertion hole 11*c*. In a state where the operation button 3 is supported by the housing 2, the restricted protrusions 21*a* are in a state of being engageable with the restricting protrusions 11*a* in the axial direction of the operation shaft 20, and the operation button 3 is prevented from falling off from the housing 2 by engagement of the restricted protrusions 21*a* with the respective restricting protrusions 11*a*.

In a state where the operation button 3 is supported by housing 2, the facing surface 19*b* of the operation button 3 is positioned to face the overhanging portion 11 of the second case 5 (see FIG. 3). Furthermore, in a state where the operation button 3 is supported by the housing 2, the tip end surface of the operation shaft 20 of the operation button 3 is positioned to face the switch 18 mounted on the board 16.

Figure 4:
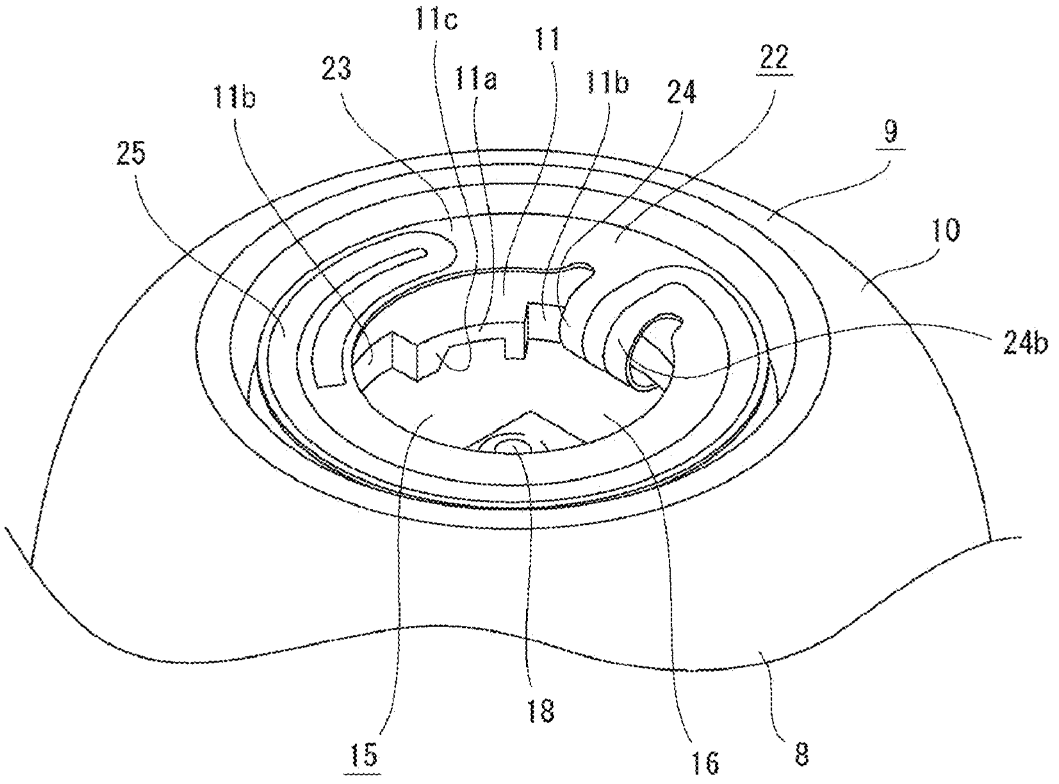
FIG. 4 is a perspective view illustrating an arrangement state and the like of a flexible printed wiring board.

In the flexible printed wiring board 22, in a state where the operation button 3 is supported by the housing 2, the lead-out portion 24 is inserted into the insertion hole 11*c* in the second case 5 and the connection portion 24*a* is attached to the inner surface of the overhanging portion 11 of the second case 5 by adhesion or the like (see FIGS. 3 and 4).

In a state where the connection portion 24*a* of the flexible printed wiring board 22 is attached to the inner surface of the overhanging portion 11, the elastic deformation portion 17*b* of the spring terminal 17 is pressed against the connection portion 24*a* (see FIG. 3). Therefore, the connection portion 24*a* of the flexible printed wiring board 22 is stably connected to the circuit pattern of the control circuit board 15 via the spring terminal 17.

In a state where the operation button 3 is supported by the housing 2, a packing 27 is disposed between the attached portion 23 of the flexible printed wiring board 22 and the overhanging portion 11 of the second case 5. The packing 27 is made of an elastically deformable rubber material or the like and formed in, for example, an annular shape, and formed in an inclined shape in the cross section. Therefore, the packing 27 is formed in a shape in which one end portion 27*a* and the other end portion 27*b* in the axial direction are at different positions in the radial direction.

The packing 27 is elastically deformed in a state of being disposed between the attached portion 23 and the overhanging portion 11, so that the one end portion 27*a* is brought into close contact with the attached portion 23 of the flexible printed wiring board 22 while the other end portion 27*b* is brought into close contact with the overhanging portion 11 of the second case 5. Therefore, a biasing force is applied to the operation button 3 by the packing 27 via the flexible printed wiring board 22, so that the operation button 3 is biased in a direction away from the control circuit board 15.

Note that the inclination direction of the packing 27 in the cross section may be opposite, so that the one end portion 27*a* may be brought into close contact with the overhanging portion 11 while the other end portion 27*b* may be brought into close contact with the attached portion 23.

Since the space inside the housing 2 and the space outside the housing 2 are partitioned by the packing 27, the packing 27 has a waterproof function and also has a function of acoustically separating the space inside and the space outside the housing 2. The packing 27 also functions as a biasing spring that biases the operation button 3 in a direction away from the control circuit board 15.

When the operation button 3 is biased by the packing 27 in a direction away from the control circuit board 15, the restricted protrusions 21*a* of the engagement protrusions 21 of the operation button 3 are engaged with the respective restricting protrusions 11*a* of the overhanging portion 11 in a state of being pressed against the restricting protrusions 11*a*. At this time, the operation shaft 20 of the operation button 3 is positioned away from the switch 18.

An ear piece 28 formed of, for example, a rubber material is attached to the tip end portion of the sound conduit 7 in the housing 2. The ear piece 28 is detachably attached to the sound conduit 7.

<Assembly Procedure of Sound Output Device According to First Embodiment>

The assembly procedure of the sound output device 1 will be described below (see FIGS. 5 and 6).

Figure 5:
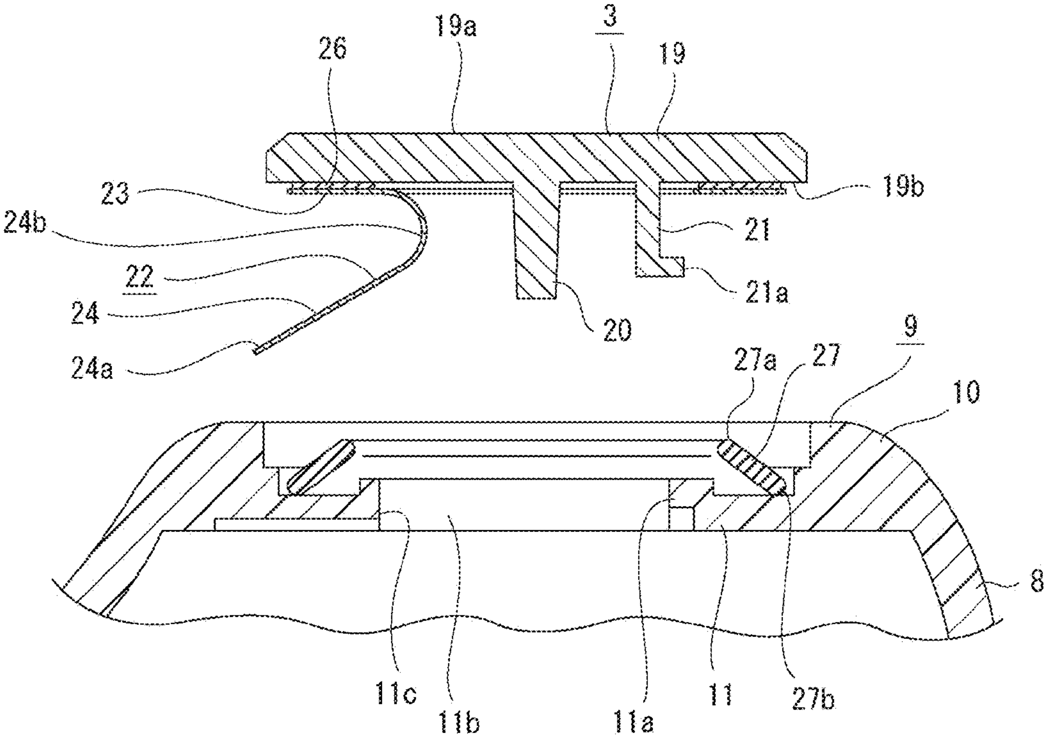
FIG. 5 is a cross-sectional view illustrating the sound output device in the middle of assembling.

First, necessary units such as the speaker 12, the board attachment member 13, and the battery 14 are attached to the first case 4, the attached portion 23 of the flexible printed wiring board 22 is attached to the operation button 3, and the packing 27 is placed on the overhanging portion 11 of the second case 5 (see FIG. 5).

Next, the operation button 3 is supported by the second case 5, the lead-out portion 24 of the flexible printed wiring board 22 is inserted into the insertion hole 11*c* of the second case 5, and the connection portion 24*a* of the flexible printed wiring board 22 is attached to the overhanging portion 11

Figure 6:
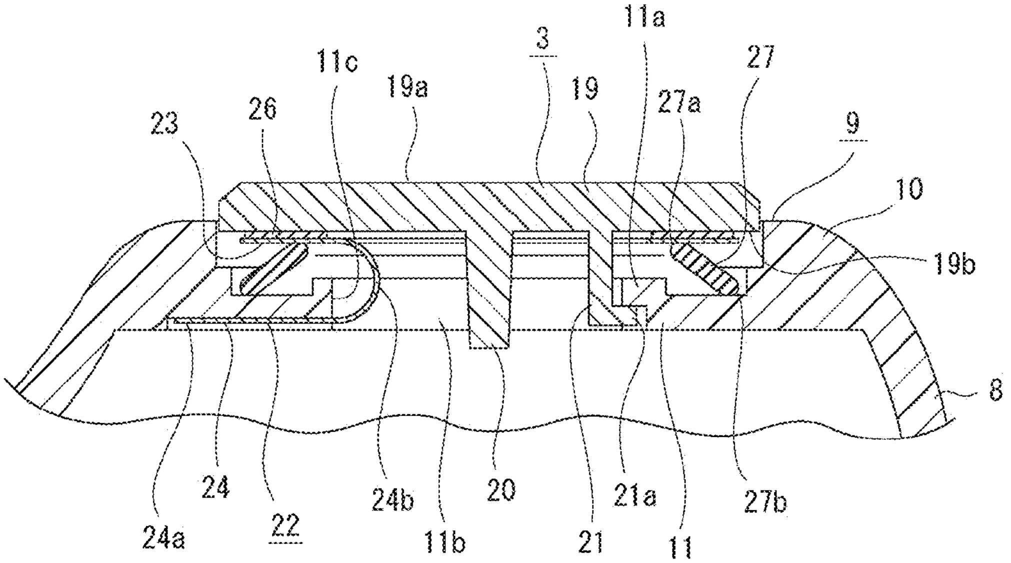
FIG. 6 is a cross-sectional view illustrating the sound output device in the middle of assembling, subsequent to FIG. 5.

(see FIG. 6). At this time, the elastic deformation portion 17*b* of the spring terminal 17 is pressed against the connection portion 24*a*, and the antenna pattern 25 is connected to the circuit pattern of the control circuit board 15 via the spring terminal 17.

Finally, the first case 4 and the second case 5 are coupled by adhesion or the like, whereby the assembly of the sound output device 1 is completed.

<Operation on Operation Button of Sound Output Device According to First Embodiment>

Next, the operation on the operation button 3 will be described (see FIGS. 7 and 8).

The operation button 3 is moved to one side in the axial direction of the operation shaft 20 with respect to the housing 2 by a pressing operation on the pressed surface 19*a*. In the pressing operation on the operation button 3, a direction of the operation is defined as an operation direction, and a direction opposite to the operation direction is defined as a restore direction.

Figure 7:
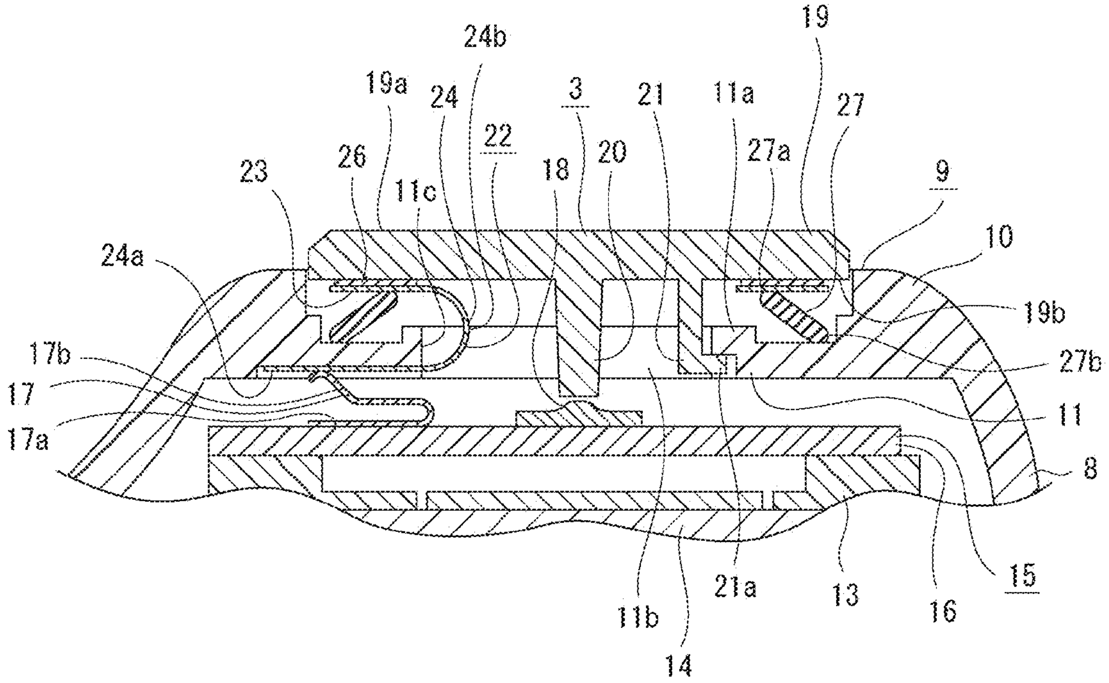
FIG. 7 is a cross-sectional view illustrating a state before an operation button is operated.

In the sound output device 1 before the operation button 3 is operated, the operation button 3 is positioned farthest away from the control circuit board 15 in the axial direction of the operation shaft 20 by the biasing force of the packing 27, the restricted protrusions 21*a* of the operation button 3 are engaged with the respective restricting protrusions 11*a*, and the operation shaft 20 is positioned away from the switch 18 (see FIG. 7).

Figure 8:
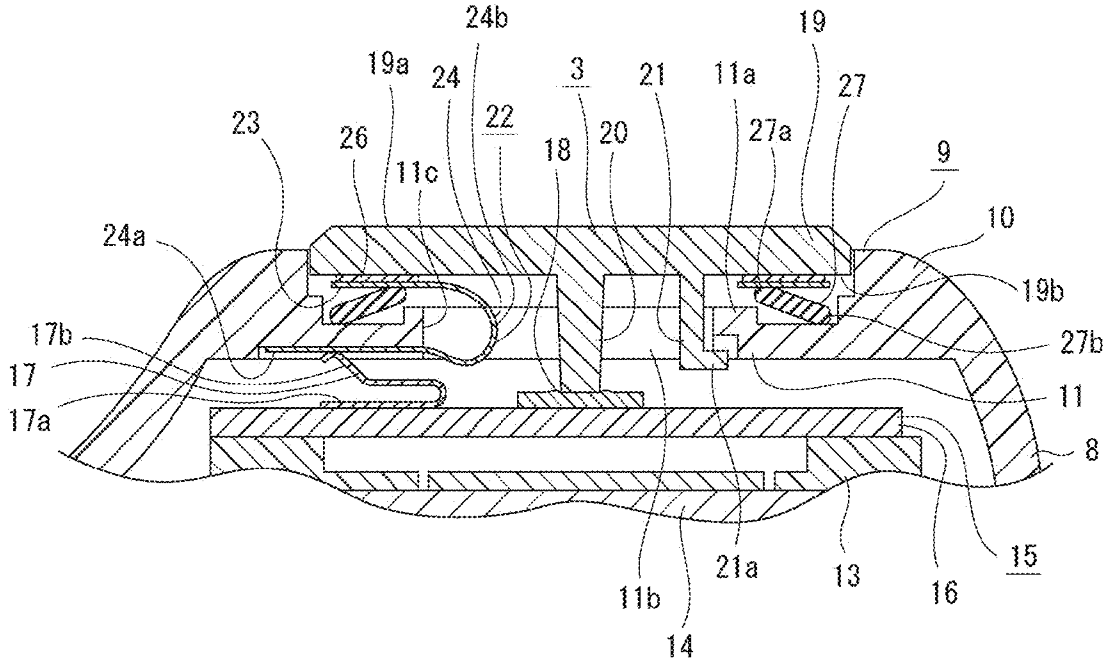
FIG. 8 is a cross-sectional view illustrating a state when the operation button is operated.

When the operation button 3 is pressed and moved in the operation direction, the packing 27 is elastically deformed, the bent portion 24*b* of the flexible printed wiring board 22 is bent to increase the degree of bending, and the switch 18 is pressed by the operation shaft 20 (see FIG. 8). When the switch 18 is operated, various functions such as turning on/off of a power supply, change of a mode, and play and stop of music are performed.

When the pressing operation on the operation button 3 is released, the packing 27 is elastically restored, the operation button 3 is moved in the restore direction by the biasing force of the packing 27, the degree of bending of the bent portion 24*b* in the flexible printed wiring board 22 decreases, and the pressed state of the switch 18 by the operation shaft 20 is released (see FIG. 7). When the operation button 3 is moved in the restore direction, the restricted protrusions 21*a* of the operation button 3 are again engaged with the respective restricting protrusions 11*a*, and the state returns to the state before the operation button 3 is operated.

<Summary of Sound Output Device According to First Embodiment>

As described above, the sound output device 1 includes the housing 2 including the arrangement space 2*a* therein and in which the insertion hole 11*c* communicating with the arrangement space 2*a* is formed, the control circuit board 15 arranged in the arrangement space 2*a*, the operation button 3 including the pressed portion 19 having a front surface formed as the pressed surface 19*a* to be pressed when the operation button 3 is operated and the engagement protrusions 21 protruding from the pressed portions 19 and inserted into the insertion holes 11*c*, and the flexible printed wiring board 22 on which the antenna pattern 25 is formed, in which the flexible printed wiring board 22 is attached to the back surface (facing surface 19*b*) of the pressed portion 19.

Therefore, there is no space between the pressed portion 19 of the operation button 3 and the antenna pattern 25, and thus the distance between the control circuit board 15 and the pressed portion 19 can be reduced in a state where the control circuit board 15 and the antenna pattern 25 are separated by a certain amount or more so that the antenna pattern 25 is not affected by noise that may occur in the control circuit board 15. Therefore, the sound output device 1 can have a small size while securing its high functionality.

In particular, since the pressed portion 19 of the operation button 3 is positioned close to the housing 2 in the axial direction (left-right direction) of the operation shaft 20, the thickness can be reduced, and the portion protruding from the ear in a state where the sound output device 1 is worn on the ear can be reduced.

Furthermore, the housing 2 is provided with the annular overhanging portion 11 positioned between the pressed portion 19 and the control circuit board 15, and the packing 27 that is in close contact with the flexible printed wiring board 22 and the overhanging portion 11 is disposed between the pressed portion 19 and the overhanging portion 11.

Therefore, since the packing 27 is in close contact with the flexible printed wiring board 22 and the overhanging portion 11 in a state of being disposed between the pressed portion 19 and the control circuit board 15, it is possible to ensure high waterproofness while reducing the size of the sound output device 1 by effectively using a space.

Moreover, since the packing 27 is formed in an annular shape, the annular packing 27 is brought into close contact with the flexible printed wiring board 22 and the overhanging portion 11, and higher waterproofness can be secured.

Furthermore, since the packing 27 is positioned around the engagement protrusions 21, the annular packing 27 is in close contact with the flexible printed wiring board 22 and the overhanging portion 11 in a state of being positioned around the engagement protrusions 21, so that interference between the packing 27 and the engagement protrusions 21 is prevented, and high waterproofness can be secured without affecting the operation of the operation button 3.

Furthermore, the packing 27 is made elastically deformable, so that a biasing force in the restore direction is applied to the operation button 3 by the packing 27 where the restore direction is a direction opposite to a direction in which the operation button 3 is pressed.

Therefore, when the pressing operation on the operation button 3 is released, the operation button 3 can be restored by the biasing force of the packing 27 to the position before being pressed, so that the packing 27 functions as a restore spring that restores the operation button 3 to the original position, and high operability of the operation button 3 can be secured while reducing the number of components.

Moreover, the flexible printed wiring board 22 is provided with the attached portion 23 attached to the pressed portion 19 and the lead-out portion 24 having the connection portion 24*a* protruding from the attached portion 23 and connected to the spring terminal 17, which is a connection terminal of the control circuit board 15, and a portion between the attached portion 23 and the connection portion 24*a* in the lead-out portion 24 is provided as the bent portion 24*b* having a bent-back shape.

Therefore, since the bent portion 24*b* is bent when the operation button 3 is operated and moved, a load from the flexible printed wiring board 22 is hardly applied to the operation button 3, and good operability of the operation button 3 can be secured.

Furthermore, since the attached portion 23 is formed in an annular shape, the attached portion 23 formed in an annular shape is attached to the pressed portion 19 of the operation button 3, the attachment area of the flexible printed wiring board 22 with respect to the operation button 3 is increased, and high attachment strength of the flexible printed wiring board 22 with respect to the operation button 3 can be secured.

Furthermore, since the lead-out portion 24 protrudes from the inner periphery of the attached portion 23, the lead-out portion 24 can be positioned inside the attached portion 23, and the arrangement space of the flexible printed wiring board 22 in the arrangement space 2*a* is reduced, so that the sound output device 1 can have a small size.

Moreover, with the configuration in which the lead-out portion 24 protrudes from the inner periphery of the attached portion 23, the attached portion 23 can be enlarged, and accordingly, the area of the antenna pattern 25 formed on the operation button 3 can be increased, and transmission and reception of the wireless communication signals can be stabilized.

In addition, the spring terminal 17 having the elastic deformation portion 17*b* is provided as a connection terminal of the control circuit board 15, and the elastic deformation portion 17*b* is connected to a part (connection portion 24*a*) of the flexible printed wiring board 22 in a state of being pressed against the part.

Therefore, for example, even when vibration or the like occurs from the outside with respect to the sound output device 1, the spring terminal 17 in an elastically deformed state is pressed against the flexible printed wiring board 22, so that the stable connection state between the flexible printed wiring board 22 and the control circuit board 15 can be secured.

<Configuration of Sound Output Device According to Second Embodiment>

Figure 9:
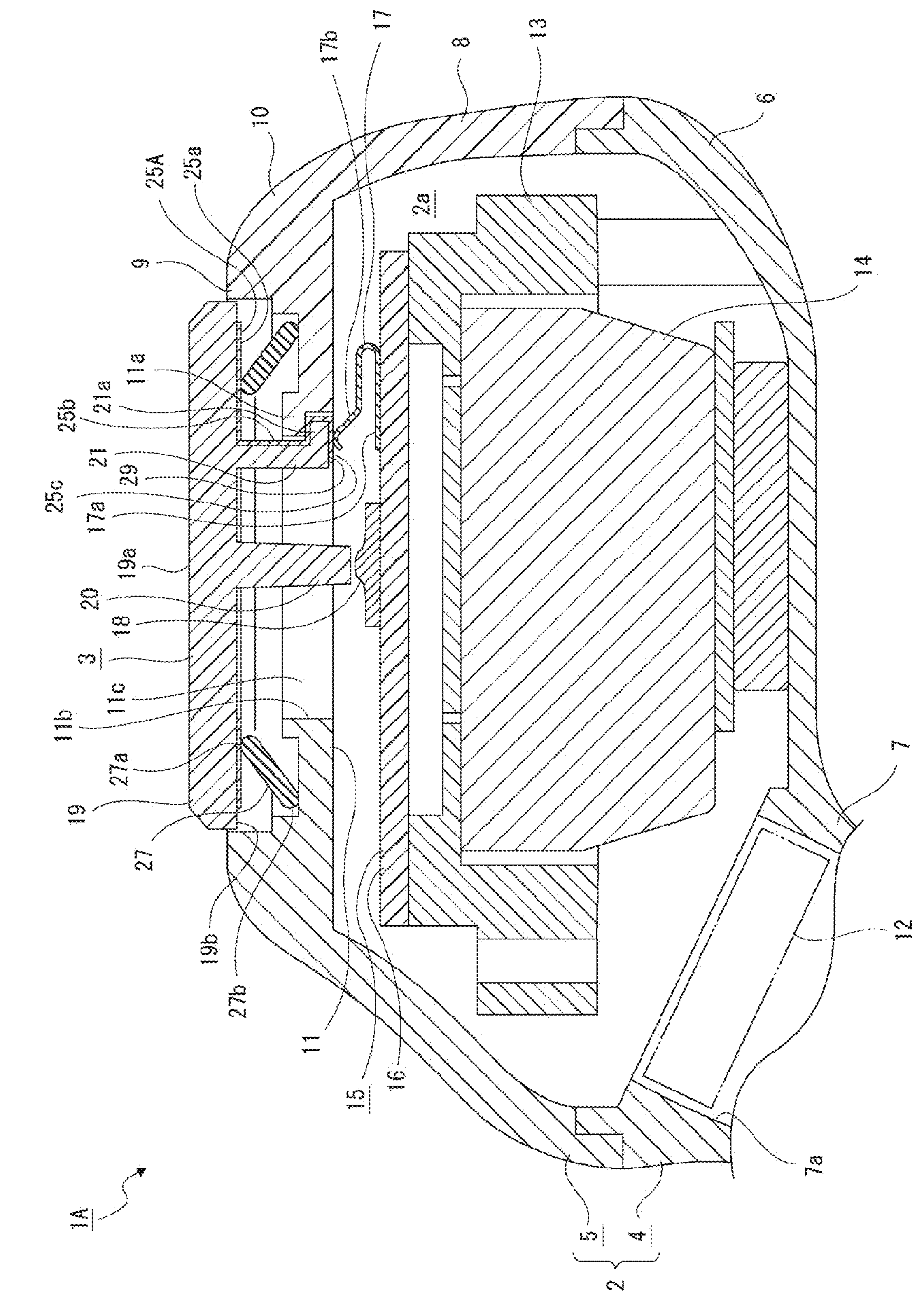
FIG. 9 illustrates a second embodiment of a sound output device of the present technology together with FIGS. 10 to 13, and this figure is a cross-sectional view of the sound output device.

Hereinafter, a configuration of a sound output device 1A according to a second embodiment will be described (see FIG. 9).

Note that, the sound output device 1A described below is different from the sound output device 1 described above only in that an antenna pattern is formed on the operation button. Thus, only portions different from the sound output device 1 will be described in detail, and the other portions will be denoted by the same reference numerals as the reference numerals assigned to similar portions in the sound output device 1, and description thereof will be omitted.

The sound output devices 1A are used, for example, as a pair, one for the left ear and the other for the right ear. However, only one sound output device 1A may be used to hear sound.

The sound output device 1A includes a housing 2 provided as an outer casing, required units arranged inside the housing 2, and an operation button 3 supported by the housing 2.

In the sound output device 1A, the flexible printed wiring board 22 is not provided, and an antenna pattern 25A is formed on each surface of the operation button 3. The antenna pattern 25A is formed on the operation button 3 by a three-dimensional wiring forming technique called laser direct structuring.

The antenna pattern 25A is formed at a position extending from a facing surface 19*b* of a pressed portion 19 through the outer surfaces of engagement protrusions 21 to facing surfaces 29 of restricted protrusions 21*a* facing a control circuit board 15. In the antenna pattern 25A, a portion formed on the facing surface 19*b* is formed as an outermost portion 25*a* positioned outermost, portions formed between the facing surface 19*b* and the facing surfaces 29 are formed as intermediate portions 25*b*, and portions formed on the facing surfaces 29 are formed as contact portions 25*c*.

In the antenna pattern 25A, the elastic deformation portion 17*b* of the spring terminal 17 is pressed against and connected to the contact portions 25*c* in a state where the operation button 3 is supported by the housing 2. Therefore, the antenna pattern 25A is stably connected to the circuit pattern of the control circuit board 15 via the spring terminal 17.

In a state where the operation button 3 is supported by housing 2, a packing 27 is disposed between the pressed portion 19 of the operation button 3 and an overhanging portion 11 of a second case 5.

The packing 27 is elastically deformed in a state of being disposed between the pressed portion 19 and the overhanging portion 11, and one end portion 27*a* is brought into close contact with the outermost portion 25*a* of the antenna pattern 25A, and the other end portion 27*b* is brought into close contact with the overhanging portion 11 of the second case 5. Therefore, a biasing force is applied to the operation button 3 from the packing 27, and the operation button 3 is biased in a direction away from the control circuit board 15.

When the operation button 3 is biased by the packing 27 in a direction away from the control circuit board 15, the restricted protrusions 21*a* of the engagement protrusions 21 of the operation button 3 are engaged with the respective restricting protrusions 11*a* of the overhanging portion 11 in a state of being pressed against the restricting protrusions 11*a*. At this time, the operation shaft 20 of the operation button 3 is positioned away from the switch 18.

<Assembly Procedure of Sound Output Device According to Second Embodiment>

The assembly procedure of the sound output device 1A will be described below (see FIGS. 10 and 11).

Figure 10:
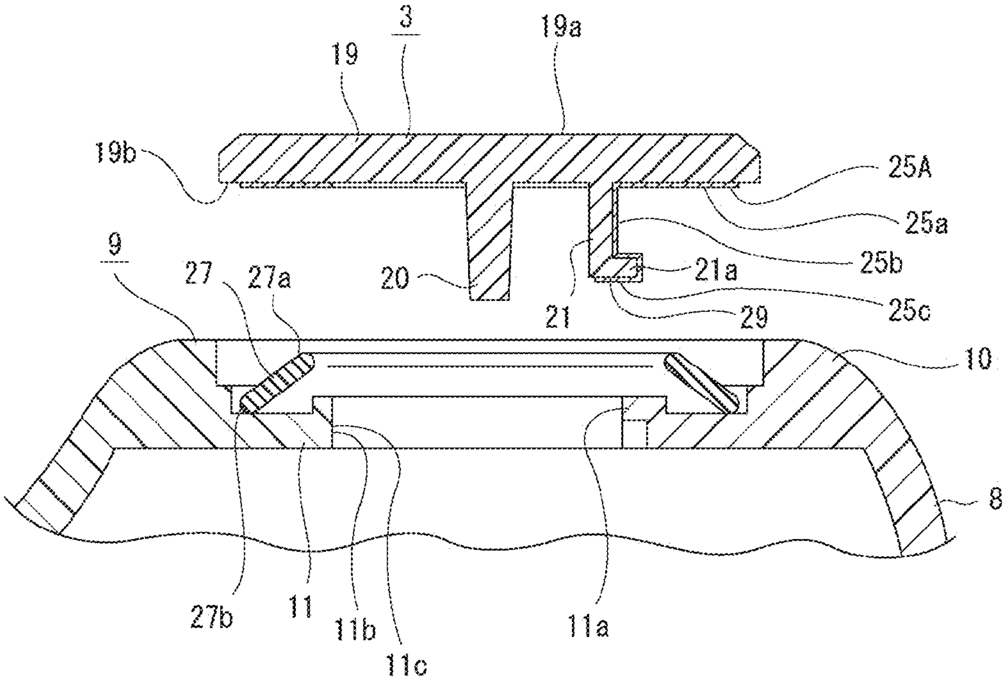
FIG. 10 is a cross-sectional view illustrating the sound output device in the middle of assembling.

First, necessary units such as the speaker 12, the board attachment member 13, and the battery 14 are attached to the first case 4, the antenna pattern 25A is formed on the operation button 3, and the packing 27 is placed on the overhanging portion 11 of the second case 5 (see FIG. 10).

Figure 11:
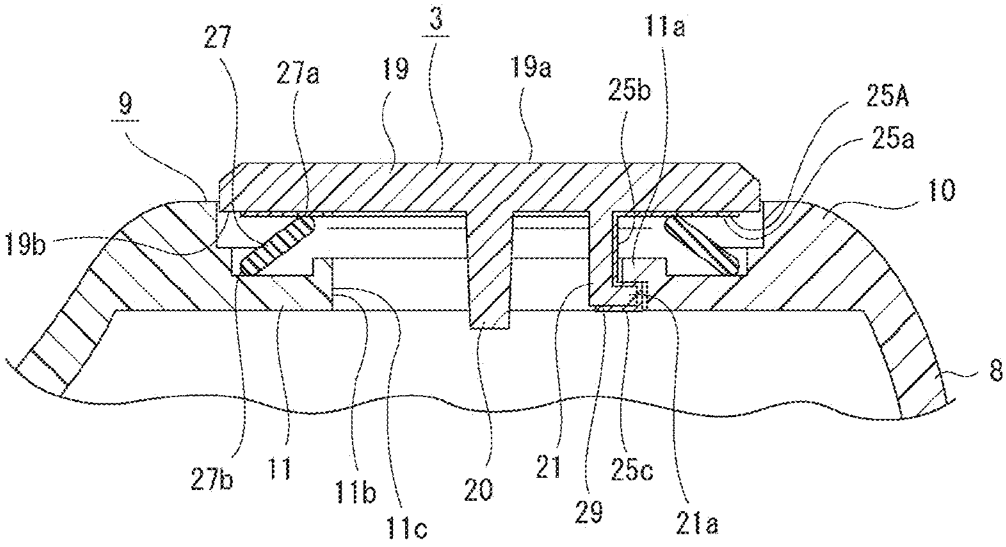
FIG. 11 is a cross-sectional view illustrating the sound output device in the middle of assembling, subsequent to FIG. 10.

Next, the operation button 3 is supported by the second case 5 (see FIG. 11). At this time, the elastic deformation portion 17*b* of the spring terminal 17 is pressed against the contact portions 25*c* of the antenna pattern 25A, and the antenna pattern 25A is connected to the circuit pattern of the control circuit board 15 via the spring terminal 17.

Finally, the first case 4 and the second case 5 are coupled by adhesion or the like, whereby the assembly of the sound output device 1A is completed.

<Operation on Operation Button of Sound Output Device According to Second Embodiment>

Next, the operation on the operation button 3 will be described (see FIGS. 12 and 13).

Figure 12:
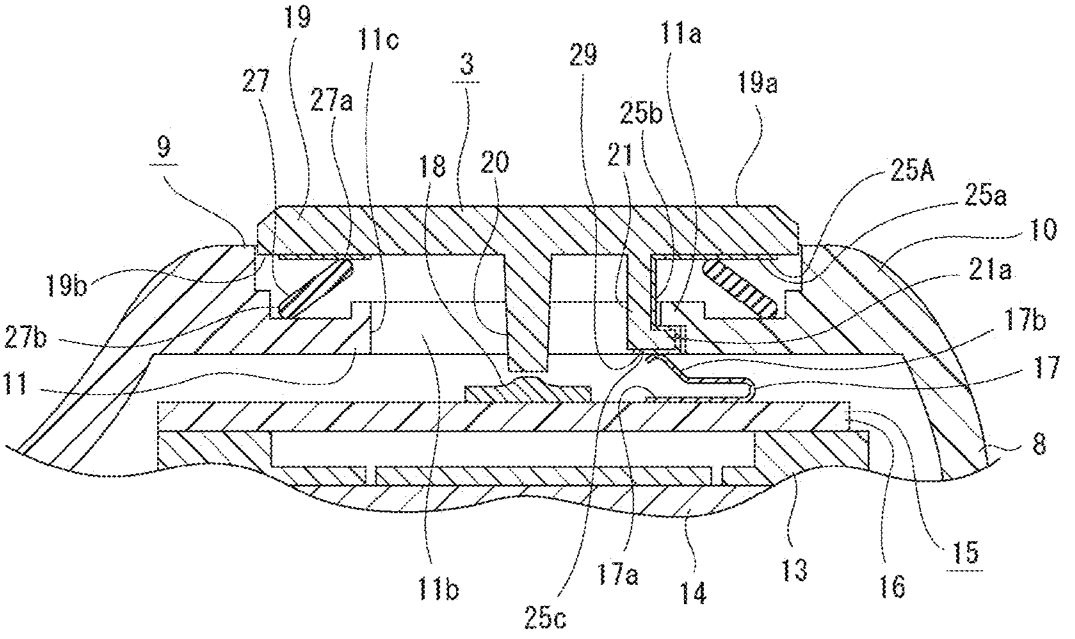
FIG. 12 is a cross-sectional view illustrating an operation button before it is operated.

In the sound output device 1A before the operation button 3 is operated, the operation button 3 is positioned farthest away from the control circuit board 15 in the axial direction of the operation shaft 20 by the biasing force of the packing 27, the restricted protrusions 21*a* of the operation button 3 are engaged with the respective restricting protrusions 11*a*, and the operation shaft 20 is positioned away from the switch 18 (see FIG. 12).

Figure 13:
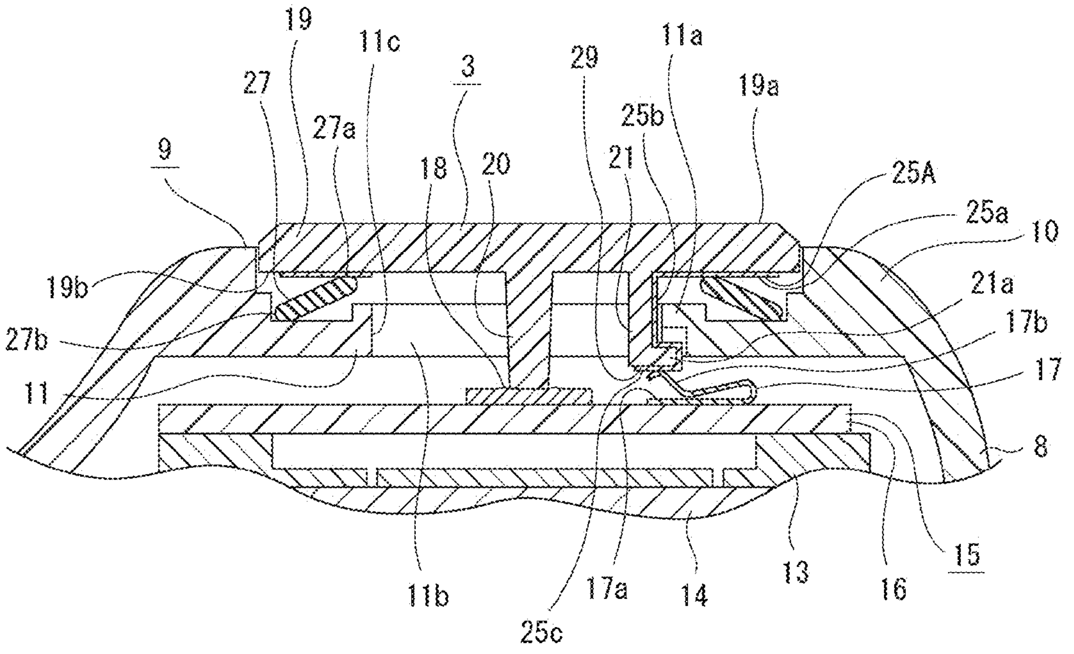
FIG. 13 is a cross-sectional view illustrating the operation button when it is operated.

When the operation button 3 is pressed and moved in the operation direction, the packing 27 is elastically deformed, and the switch 18 is pressed by the operation shaft 20 (see FIG. 13).

When the pressing operation on the operation button 3 is released, the packing 27 is elastically restored, the biasing force of the packing 27 moves the operation button 3 in the restore direction, and the pressed state of the switch 18 by the operation shaft 20 is released (see FIG. 12). When the operation button 3 is moved in the restore direction, the restricted protrusions 21*a* of the operation button 3 are again engaged with the respective restricting protrusions 11*a*, and the state returns to the state before the operation button 3 is operated.

<Summary of Sound Output Device According to First Embodiment>

As described above, the sound output device 1A includes the housing 2 including the arrangement space 2*a* therein and in which the insertion hole 11*c* communicating with the arrangement space 2*a* is formed, and the control circuit board 15 arranged in the arrangement space 2*a*, and the antenna pattern 25 is formed on at least the back surface (facing surface 19*b*) of the pressed portion 19.

Therefore, there is no space between the pressed portion 19 of the operation button 3 and the antenna pattern 25A, and thus the distance between the control circuit board 15 and the pressed portion 19 can be reduced in a state where the control circuit board 15 and the antenna pattern 25A are separated by a certain amount or more so that the antenna pattern 25A is not affected by noise that may occur in the control circuit board 15. Therefore, the sound output device 1A can have a small size while securing its high functionality.

In particular, since the pressed portion 19 of the operation button 3 is positioned close to the housing 2 in the axial direction (left-right direction) of the operation shaft 20, the thickness can be reduced, and the portion protruding from the ear in a state where the sound output device 1A is worn on the ear can be reduced.

Furthermore, the housing 2 is provided with the annular overhanging portion 11 positioned between the pressed portion 19 and the control circuit board 15, and the packing 27 that is in close contact with the antenna pattern 25A and the overhanging portion 11 is disposed between the pressed portion 19 and the overhanging portion 11.

Therefore, since the packing 27 is in close contact with the antenna pattern 25A and the overhanging portion 11 in a state of being disposed between the pressed portion 19 and the control circuit board 15, it is possible to ensure high waterproofness while reducing the size of the sound output device 1A by effectively using a space.

Moreover, since the packing 27 is formed in an annular shape, the annular packing 27 is brought into close contact with the antenna pattern 25A and the overhanging portion 11, and higher waterproofness can be secured.

Furthermore, since the packing 27 is positioned around the engagement protrusions 21, the annular packing 27 is in close contact with the antenna pattern 25A and the overhanging portion 11 in a state of being positioned around the engagement protrusions 21, so that interference between the packing 27 and the engagement protrusions 21 is prevented, and high waterproofness can be secured without affecting the operation of the operation button 3.

Furthermore, the packing 27 is made elastically deformable, so that a biasing force in the restore direction is applied to the operation button 3 by the packing 27 where the restore direction is a direction opposite to a direction in which the operation button 3 is pressed.

Therefore, when the pressing operation on the operation button 3 is released, the operation button 3 can be restored by the biasing force of the packing 27 to the position before being pressed, so that the packing 27 functions as a restore spring that restores the operation button 3 to the original position, and high operability of the operation button 3 can be secured while reducing the number of components.

In addition, the antenna pattern 25A is formed at a position extending from the pressed portion 19 to the tip end surfaces (facing surfaces 29) of the engagement protrusions 21, a portion of the antenna pattern 25A formed on the tip end surfaces of the engagement protrusions 21 are contact portions 25*c*, the spring terminal 17 having the elastic deformation portion 17*b* is provided as a connection terminal of the control circuit board 15, and the contact portions 25*c* are connected to the spring terminal 17.

Therefore, the spring terminal 17 is elastically deformed with the movement of the operation button 3, so that a load from the spring terminal 17 is hardly applied to the operation button 3, and good operability of the operation button 3 can be secured while a stable connection state between the antenna pattern 25A and the control circuit board 15 is secured.

<Modifications of Packing>

Hereinafter, modifications of the packing will be described (see FIGS. 14 to 20). Note that, in the following, examples in which packings according to the modifications are used in the above-described first embodiment having the flexible printed wiring board 22 will be described. However, the packings according to the modifications may be used in the above-described second embodiment that does not have the flexible printed wiring board 22.

Figure 14:
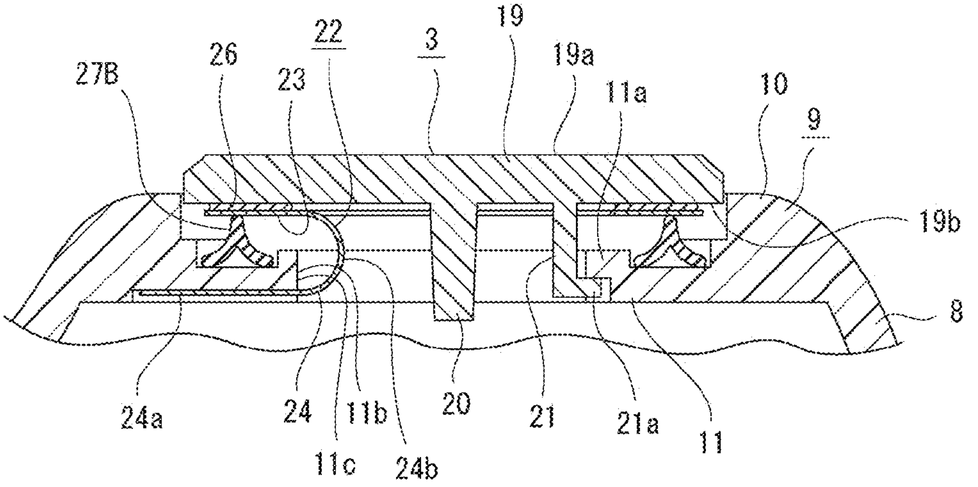
FIG. 14 is a cross-sectional view illustrating a packing according to a first modification.

A packing 27A according to a first modification is formed in a semicircular arc shape that is convex toward the pressed portion 19, in the cross section (see FIG. 14). The packing 27A is elastically deformed in a state of being disposed between the attached portion 23 of the flexible printed wiring board 22 and the overhanging portion 11 of the second case 5, and the intermediate portion between the inner peripheral portion and the outer peripheral portion is brought into close contact with the attached portion 23 while the inner peripheral portion and the outer peripheral portion are brought into close contact with the overhanging portion 11.

Note that the packing 27A may be formed in a semicircular arc shape that is convex toward the overhanging portion 11, and in the cross section, a portion between the inner peripheral portion and the outer peripheral portion may be brought into close contact with the overhanging portion 11 while the inner peripheral portion and the outer peripheral portion may be brought into close contact with the attached portion 23.

Since the packing 27A is brought into close contact with the overhanging portion 11 or the attached portion 23 at two positions, particularly high waterproofness can be secured.

Figure 15:
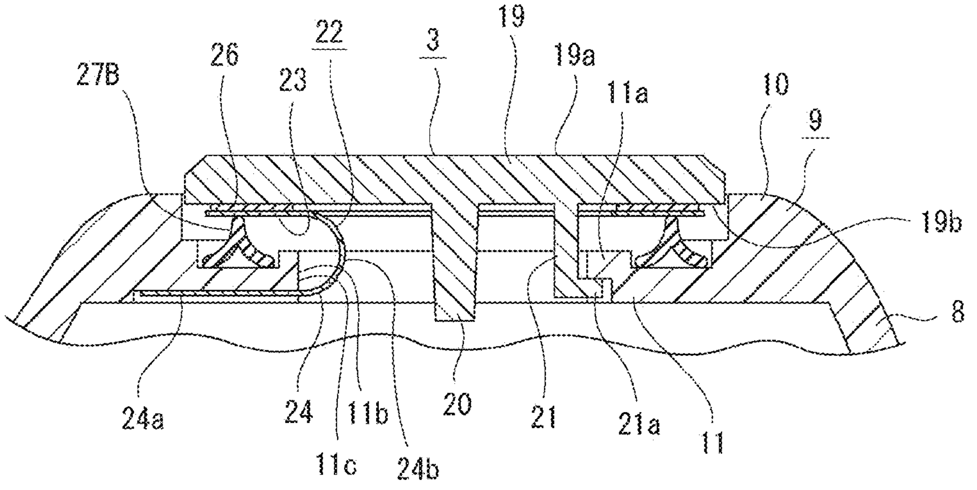
FIG. 15 is a cross-sectional view illustrating a packing according to a second modification.

A packing 27B according to a second modification is formed in a substantially V-shape that is convex toward the pressed portion 19, in the cross section (see FIG. 15). The packing 27B is elastically deformed in a state of being disposed between the attached portion 23 of the flexible printed wiring board 22 and the overhanging portion 11 of the second case 5, and the intermediate portion between the inner peripheral portion and the outer peripheral portion is brought into close contact with the attached portion 23 while the inner peripheral portion and the outer peripheral portion are brought into close contact with the overhanging portion 11.

Note that the packing 27B may be formed in a substantially V-shape that is convex toward the overhanging portion 11, in the cross section, and a portion between the inner peripheral portion and the outer peripheral portion may be brought into close contact with the overhanging portion 11 while the inner peripheral portion and the outer peripheral portion may be brought into close contact with the attached portion 23.

Since the packing 27B is brought into close contact with the overhanging portion 11 or the attached portion 23 at two positions, particularly high waterproofness can be secured.

Figure 16:
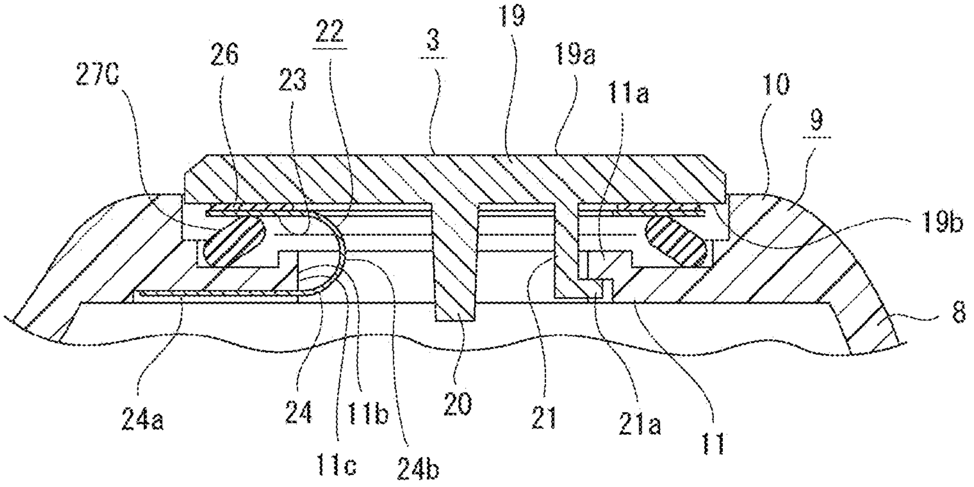
FIG. 16 is a cross-sectional view illustrating a packing according to a third modification.

A packing 27C according to a third modification is formed in an inclined shape in the cross section similarly to the packing 27, and has a thickness more than that of the packing 27 (see FIG. 16).

The packing 27C is elastically deformed in a state of being disposed between the attached portion 23 of the flexible printed wiring board 22 and the overhanging portion 11 of the second case 5, and has one end portion in close contact with the attached portion 23 while the other end portion in close contact with the overhanging portion 11.

Note that the inclination direction of the packing 27C in the cross section may be opposite, so that the one end portion may be brought into close contact with the overhanging portion 11 while the other end portion may be brought into close contact with the attached portion 23.

Since the thickness of the packing 27C is large, the close contact area between the attached portion 23 and the overhanging portion 11 in the elastically deformed state tends to be large, and particularly high waterproofness can be secured.

Figure 17:
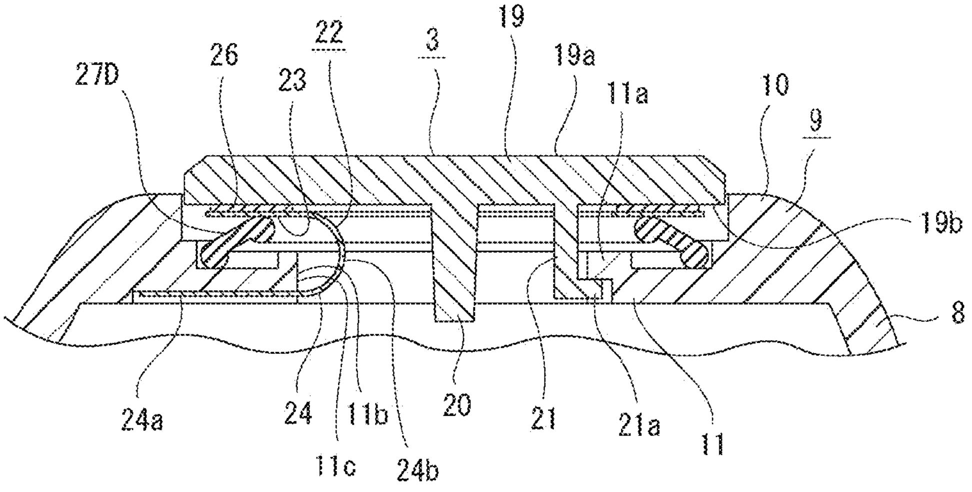
FIG. 17 is a cross-sectional view illustrating a packing according to a fourth modification.

A packing 27D according to a fourth modification is formed in an inclined shape in the cross section similarly to the packing 27, and has a thickness more than that of the packing 27 at one end portion and the other end portion (see FIG. 17).

The packing 27D is elastically deformed in a state of being disposed between the attached portion 23 of the flexible printed wiring board 22 and the overhanging portion 11 of the second case 5, and has one end portion brought into close contact with attached portion 23 while the other end portion brought into close contact with the overhanging portion 11.

Note that the inclination direction of the packing 27D in the cross section may be opposite, so that the one end portion may be brought into close contact with the overhanging portion 11 while the other end portion may be brought into close contact with the attached portion 23. Since the thickness of the packing 27D is large at one end portion and the other end portion, the close contact area between the attached portion 23 and the overhanging portion 11 in the elastically deformed state tends to be large, and particularly high waterproofness can be secured.

Figure 18:
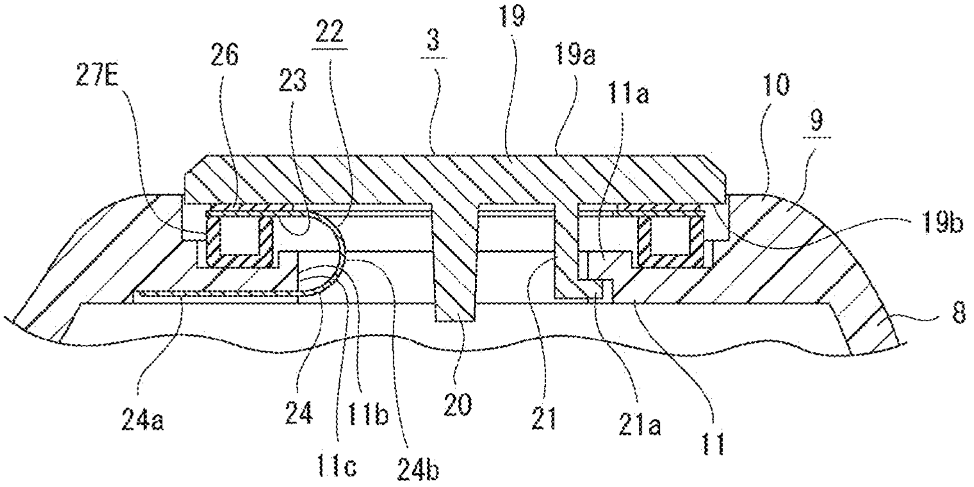
FIG. 18 is a cross-sectional view illustrating a packing according to a fifth modification.

A packing 27E according to a fifth modification is formed in a substantially U-shape that is opened toward the pressed portion 19, in the cross section (see FIG. 18). The packing 27E is elastically deformed in a state of being disposed between the attached portion 23 of the flexible printed wiring board 22 and the overhanging portion 11 of the second case 5, and each of the tip end portions of the inner peripheral portion and the outer peripheral portion is brought into close contact with the attached portion 23 while the planar portion extending from the inner peripheral portion to the outer peripheral portion is brought into close contact with the overhanging portion 11.

Note that the packing 27E may be formed in a substantially U-shape that is opened toward the overhanging portion 11, in the cross section, and each of the tip end portions of the inner peripheral portion and the outer peripheral portion may be brought into close contact with the overhanging portion 11 while the planar portion extending from the inner peripheral portion to the outer peripheral portion may be brought into close contact with the attached portion 23.

Since the packing 27E is brought into close contact with the overhanging portion 11 or the attached portion 23 at two positions while the packing 27E is brought into close contact with the overhanging portion 11 or the attached portion 23 in surface contact, particularly high waterproofness can be secured.

Figure 19:
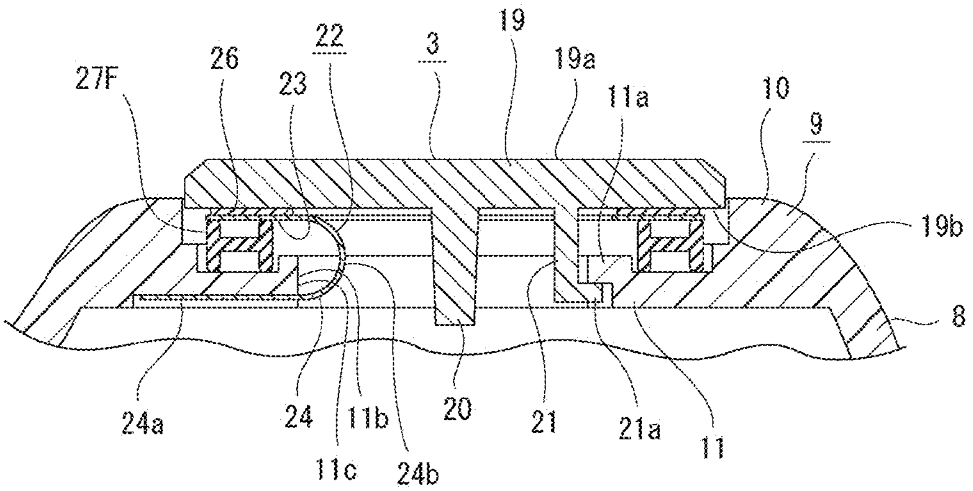
FIG. 19 is a cross-sectional view illustrating a packing according to a sixth modification.

A packing 27F according to a sixth modification is formed in a substantially H-shape in the cross section (see FIG. 19). The packing 27F is elastically deformed in a state of being disposed between the attached portion 23 of the flexible printed wiring board 22 and the overhanging portion 11 of the second case 5, and has two tip end portions at one end brought into close contact with attached portion 23 and two tip end portions at the other end brought into close contact with the overhanging portion 11.

Since the packing 27F is brought into close contact with the overhanging portion 11 and the attached portion 23 each at two positions, particularly high waterproofness can be secured.

Figure 20:
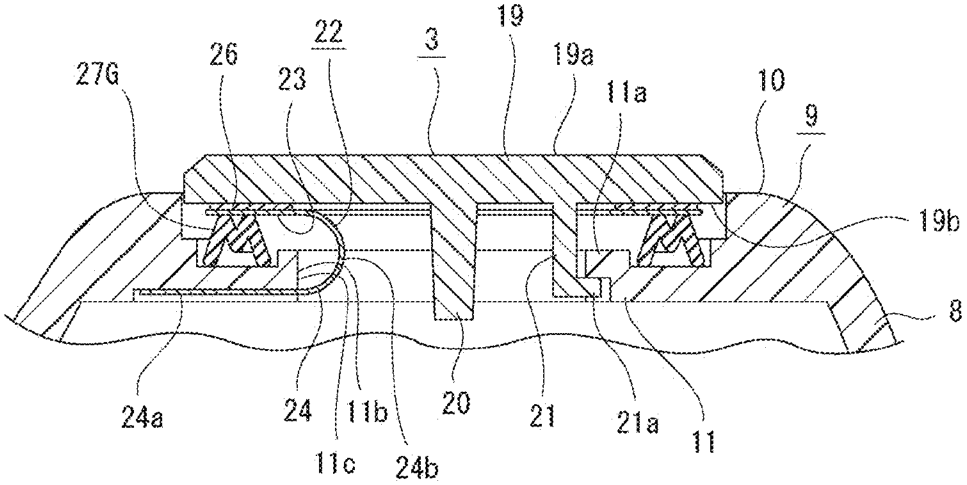
FIG. 20 is a cross-sectional view illustrating a packing according to a seventh modification.

A packing 27G according to a seventh modification is formed in a substantially M-shape in the cross section (see FIG. 20). The packing 27G is elastically deformed in a state of being disposed between the attached portion 23 of the flexible printed wiring board 22 and the overhanging portion 11 of the second case 5, and has two tip end portions at one end brought into close contact with attached portion 23 and two tip end portions at the other end brought into close contact with the overhanging portion 11.

Since the packing 27G is brought into close contact with the overhanging portion 11 and the attached portion 23 each at two positions, particularly high waterproofness can be secured.

<Modification of Sound Output Device>

Next, sound output devices 1X and 1Y according to modifications of the sound output devices 1 and 1A will be described (see FIGS. 21 to 24).

Note that, the sound output devices 1X and 1Y described below are different from the sound output devices 1 and 1A described above only in that a sheet member is used instead of the packing and a part of the structure of the operation button is different. Thus, only portions different from the sound output devices 1 and 1A will be described in detail, and the other portions will be denoted by the same reference numerals as the reference numerals assigned to similar portions in the sound output devices 1 and 1A, and description thereof will be omitted.

First, the sound output device 1X according to a modification of the sound output device 1 according to the first embodiment will be described (see FIGS. 21 and 22).

The sound output device 1X includes a housing 2 and an operation button 3X.

The operation button 3X is formed by coupling a first member 30 and a second member 31.

The first member 30 is formed by integrally forming a substantially disk-shaped pressed portion 19, a member joining portion 32 protruding in the thickness direction of the pressed portion 19 from the outer peripheral portion of the pressed portion 19, a plurality of protruding portions 33 protruding from the pressed portion 19, a coupling cylindrical portion 34 protruding from the pressed portion 19 inside the protruding portions 33, and an attachment base portion 35 continuous with the inner surface of the pressed portion 19.

A member joining portion 32 is formed as a joining surface 32*a* having a flat tip end surface. The protruding portions 33 are positioned to be spaced from each other in the circumferential direction, protrude in the same direction as the member joining portion 32 inside the member joining portion 32, and has a protrusion amount larger than that of the member joining portion 32. The coupling cylindrical portion 34 protrudes in the same direction as the protruding portions 33 inside the protruding portions 33 and is formed in a cylindrical shape. The attachment base portion 35 is positioned between the member joining portion 32 and the protruding portions 33, and is formed as an attachment surface 35*a* having a tip end surface formed as a flat surface facing the same direction as the joining surface 32*a*. The attachment surface 35*a* of the attachment base portion 35 is positioned closer to the facing surface 19*b* than the joining surface 32*a* of the member joining portion 32.

The second member 31 is formed by integrally forming a coupling shaft 36 having an outer peripheral surface formed as a cylindrical surface, a flange-shaped engagement protrusion 37 that overhangs outward from the outer peripheral surface of the coupling shaft 36, and an operation protrusion 38 protruding in the axial direction of the coupling shaft 36 from the center portion of the coupling shaft 36. The engagement protrusion 37 overhangs from one end portion of the coupling shaft 36 in the axial direction. The operation protrusion 38 protrudes from one end surface of the coupling shaft 36 in the axial direction, has a small protrusion amount, and has an outer diameter smaller than the outer diameter of the coupling shaft 36.

The other end portion of the second member 31 in the axial direction of the coupling shaft 36 is inserted into the coupling cylindrical portion 34 and coupled to the first member 30 by welding or the like.

A flexible printed wiring board 22 is attached to the operation button 3X.

The flexible printed wiring board 22 is attached to the operation button 3X by adhesion of the attached portion 23 to the attachment surface 35*a* with, for example, an adhesive material 26.

The operation button 3X is supported by the housing 2 such that the operation button 3 is movable in the axial direction of the coupling shaft 36. The coupling shaft 36 of the second member 31 is inserted into an insertion hole 11*c* from the inner surface side of the second case 5 and the coupling shaft 36 is inserted into the coupling cylindrical portion 34 and coupled to the first member 30, so that the operation button 3X is supported by the housing 2. In a state where the operation button 3X is supported by the housing 2, at least a part of the engagement protrusion 37 is in a state of being engageable with restricting protrusions 11*a* of an overhanging portion 11 in the axial direction of the coupling shaft 36, and the operation button 3X is prevented from falling off from the housing 2 by engagement of the engagement protrusion 37 with the restricting protrusions 11*a*.

In a state where the operation button 3X is supported by housing 2, the facing surface 19*b* of the operation button 3X is positioned to face the overhanging portion 11 of the second case 5. Furthermore, in a state where the operation button 3X is supported by the housing 2, the tip end surface of the coupling shaft 36 of the operation button 3X is positioned to face a switch 18 mounted on the board 16.

In a state where the operation button 3X is supported by the housing 2, a sheet member 39 is disposed between the operation button 3X and the housing 2. The sheet member 39 is made of a thin resin material or the like and formed in an annular shape, and the thickness is. For example, about 0.05 mm. The sheet member 39 includes, for example, three portions having substantially the same width in the radial direction, and the three portions are provided as an inner peripheral portion 39*a*, an intermediate portion 39*b*, and an outer peripheral portion 39*c* in this order from the inside.

In the sheet member 39, the inner peripheral portion 39*a* and the outer peripheral portion 39*c* are formed in a flat plate shape, and the intermediate portion 39*b* is formed in a curved shape.

The sheet member 39 is joined to the operation button 3X and the housing 2 by, for example, a double-sided adhesive material 40. In the sheet member 39, the inner peripheral portion 39*a* is joined to the restricting protrusions 11*a* of the overhanging portion 11 in the housing 2, and the outer peripheral portion 39*c* is joined to the joining surface 32*a* of the pressed portion 19 in the operation button 3X. In a state where the sheet member 39 is joined to the operation button 3X and the housing 2, the intermediate portion 39*b* is curved so as to be convex protruding toward the pressed portion 19 of the operation button 3X. In a state where the sheet member 39 is joined to the operation button 3X and the housing 2, the intermediate portion 39*b* is elastically deformable with respect to the inner peripheral portion 39*a* and the outer peripheral portion 39*c*, and a biasing force in the restore direction is applied to the operation button 3X from the sheet member 39.

Since the space inside the housing 2 and the space outside the housing 2 are partitioned by the sheet member 39, the sheet member 39 has a waterproof function and also has a function of acoustically separating the space inside and the space outside the housing 2. Furthermore, the sheet member 39 also functions as a biasing spring that biases the operation button 3X in a direction away from the control circuit board 15.

When the operation button 3X is biased by the sheet member 39 in a direction away from the control circuit board 15, the engagement protrusion 37 of the second member 31 in the operation button 3X is engaged with the restricting protrusions 11*a* of the overhanging portion 11 in a state of being pressed against the restricting protrusions 11*a* from the side opposite to the side where the sheet member 39 is positioned. At this time, the coupling shaft 36 of the operation button 3X is positioned away from the switch 18.

Figure 22:
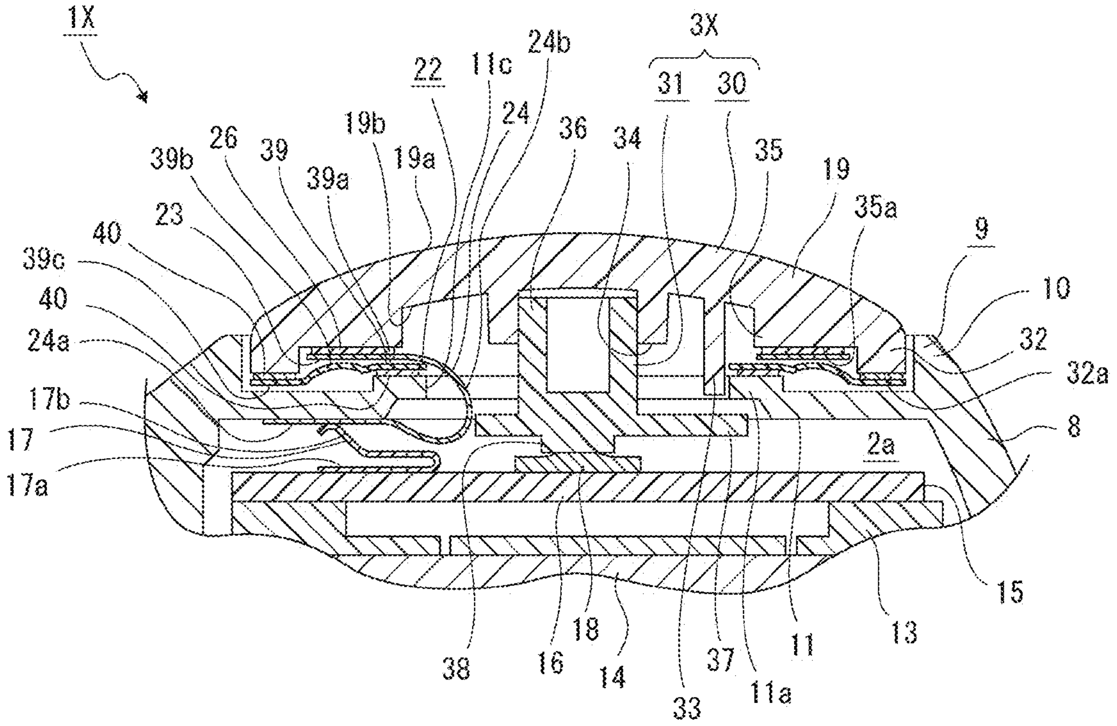
FIG. 22 is a cross-sectional view illustrating a state in which an operation button is pressed.

In the sound output device 1X configured as described above, when a pressed surface 19*a* of the operation button 3X is pressed, the sheet member 39 is elastically deformed (see FIG. 22). When the operation button 3X is pressed, the switch 18 is pressed by the coupling shaft 36, and various functions are performed.

Figure 21:
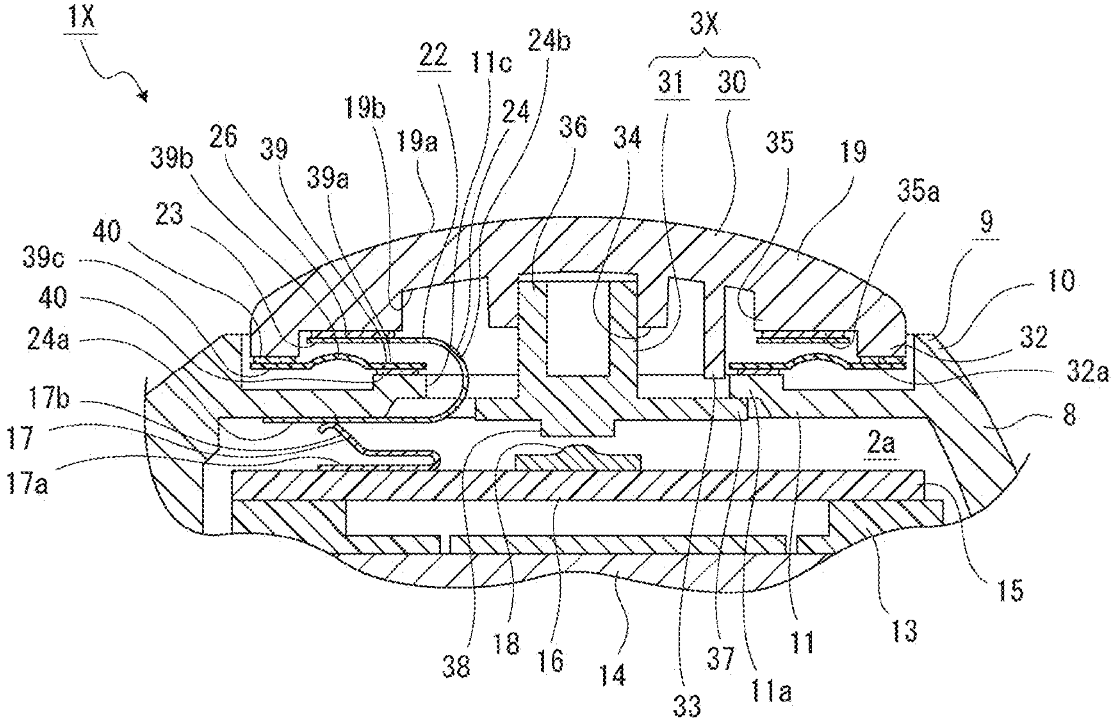
FIG. 21 illustrates a modification of the sound output device according to the first embodiment together with FIG. 22, and this figure is a cross-sectional view illustrating a state before an operation button is pressed.

When the pressing operation on the operation button 3X is released, the sheet member 39 is elastically restored, the biasing force of the sheet member 39 moves the operation button 3X in the restore direction, and the pressed state of the switch 18 by the coupling shaft 36 is released (see FIG. 21). When the operation button 3X is moved in the restore direction, the engagement protrusion 37 of the operation button 3X is again engaged with restricting protrusions 11*a*, and the state returns to the state before the operation button 3X is operated.

As described above, in the sound output device 1X, the annular sheet member 39 is disposed between the pressed portion 19 and the overhanging portion 11, and the outer peripheral portion 39*c* of the sheet member 39 is joined to the pressed portion 19 while the inner peripheral portion 39*a* is joined to the overhanging portion 11.

Therefore, since the sheet member 39 is joined to the pressed portion 19 and the overhanging portion 11 in a state of being disposed between the pressed portion 19 and the control circuit board 15, it is possible to ensure high waterproofness while reducing the size of the sound output device 1 by effectively using a space. In particular, since the sheet member 39 is joined to the pressed portion 19 and the overhanging portion 11, the effect of preventing entry of moisture into the arrangement space 2*a* is high, so that high waterproofness in the sound output device 1X can be secured.

Furthermore, in the sound output device 1*x*, the sheet member 39 having a small thickness is used to secure the waterproof property, so that the space for disposing the member for securing the waterproof property can be reduced, and the thickness can be reduced accordingly.

Moreover, the sheet member 39 is made elastically deformable, and the sheet member 39 applies a biasing force in the restore direction to the operation button 3X.

Therefore, when the pressing operation on the operation button 3X is released, the operation button 3X can be restored by the biasing force of the sheet member 39 to the position before being pressed, so that the sheet member 39 functions as a restore spring that restores the operation button 3X to the original position, and high operability of the operation button 3X can be secured while reducing the number of components.

Note that, in the above description, an example has been described in which the operation button 3X includes two members, of the first member 30 and the second member 31. Since the sheet member 39 is joined to the operation button 3X and the housing 2, it is difficult to rotate the operation button 3X with respect to the housing 2. Therefore, it is difficult to perform so-called bayonet coupling, that is, rotating the operation button 3X in a state where the coupling shaft 36 is inserted into the insertion hole 11*c* from the outer surface side of the housing 2 in order to prevent the operation button 3X from falling off from the housing 2, so that, the operation button 3X includes two members, the first member 30 and the second member 31.

However, in a case where the operation button 3X is configured to be prevented from falling off from the housing 2 by means other than the bayonet coupling, the operation button 3X can be integrally formed by a single member such as the operation button 3 instead of including two members.

Next, the sound output device 1Y according to a modification of the sound output device 1A according to the second embodiment will be described (see FIGS. 23 and 24). Note that, regarding the sound output device 1Y, description of components similar to those of the sound output device 1X will be omitted.

The sound output device 1Y includes a housing 2 and an operation button 3Y.

The operation button 3Y has substantially the same configuration as the operation button 3X, and is different from the operation button 3X only in that the length of a part of the protruding portions 33 is longer than that of the operation button 3X and provided as a protruding portion 33Y.

In the sound output device 1Y, an antenna pattern 25 is formed on each surface of the operation button 3Y. The antenna pattern 25 is formed at a position extending from an attachment base portion 35 of a first member 30 to a tip end surface 33*a* of the protruding portion 33Y through the outer peripheral surface of the protruding portion 33Y.

In the antenna pattern 25, the elastic deformation portion 17*b* of the spring terminal 17 is pressed against and connected to the contact portions 25*c* in a state where the operation button 3Y is supported by the housing 2. Therefore, the antenna pattern 25 is stably connected to the circuit pattern of the control circuit board 15 via the spring terminal 17.

The operation button 3Y is supported by the housing 2 such that the operation button 3Y is movable in the axial direction of the coupling shaft 36. In a state where the operation button 3Y is supported by the housing 2, a sheet member 39 is disposed between the operation button 3Y and the housing 2.

Since the space inside the housing 2 and the space outside the housing 2 are partitioned by the sheet member 39, the sheet member 39 has a waterproof function and also has a function of acoustically separating the space inside and the space outside the housing 2. The sheet member 39 also functions as a biasing spring that biases the operation button 3Y in a direction away from the control circuit board 15.

When the operation button 3Y is biased by the sheet member 39 in a direction away from the control circuit board 15, the engagement protrusion 37 of the second member 31 in the operation button 3Y is engaged with the restricting protrusions 11*a* of the overhanging portion 11 in a state of being pressed against the restricting protrusions 11*a* from the side opposite to the side where the sheet member 39 is positioned. At this time, the coupling shaft 36 of the operation button 3Y is positioned away from the switch 18.

Figure 24:
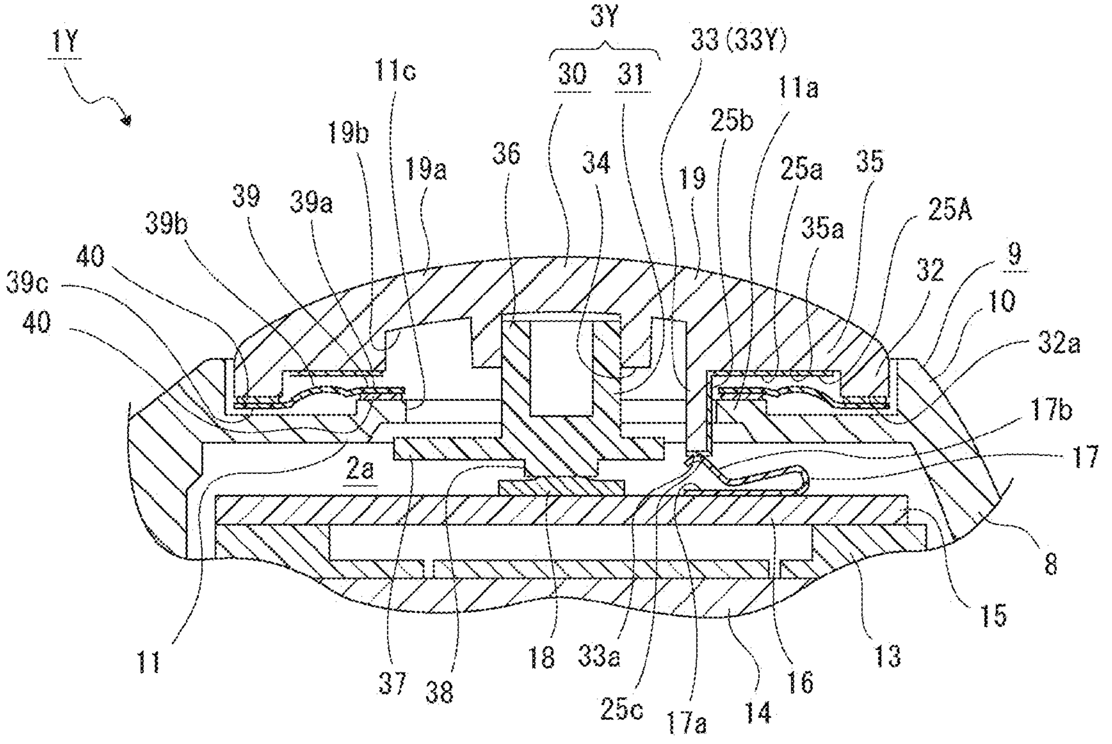
FIG. 24 is a cross-sectional view illustrating a state in which an operation button is pressed.

In the sound output device 1Y configured as described above, when a pressed surface 19*a* of the operation button 3Y is pressed, the sheet member 39 is elastically deformed (see FIG. 24). When the operation button 3Y is pressed, the switch 18 is pressed by the coupling shaft 36, and various functions are performed.

Figure 23:
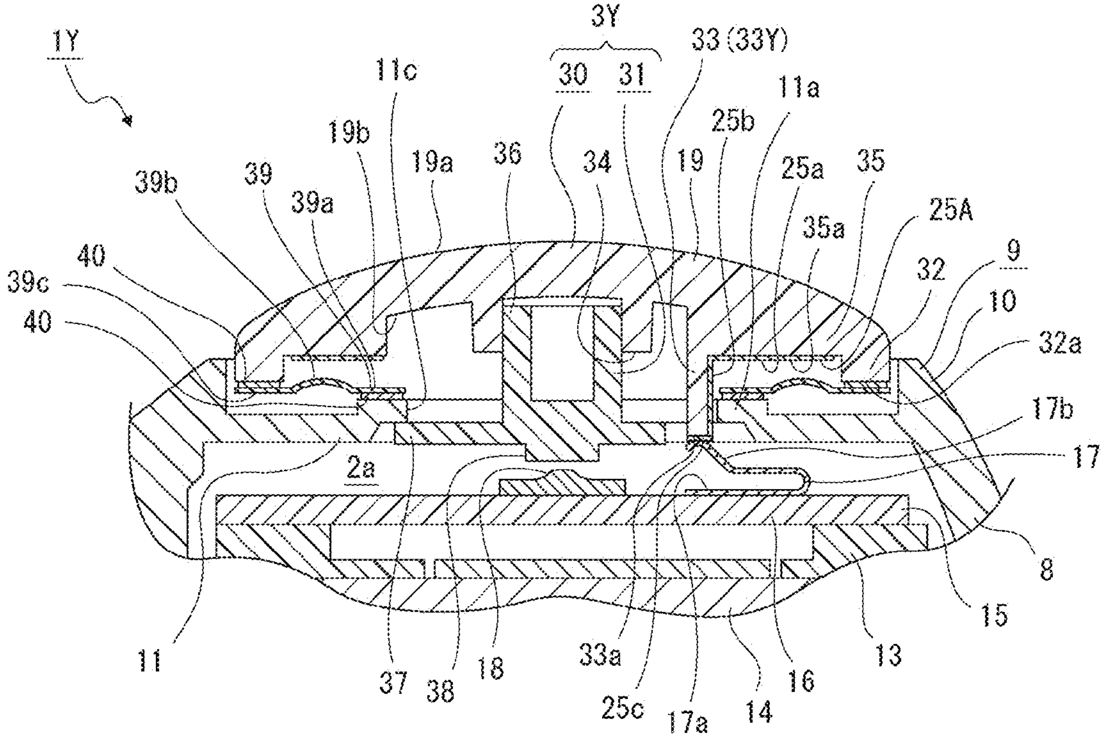
FIG. 23 illustrates a modification of the sound output device according to the second embodiment together with FIG. 24, and this figure is a cross-sectional view illustrating a state before an operation button is pressed.

When the pressing operation on the operation button 3Y is released, the sheet member 39 is elastically restored, the biasing force of the sheet member 39 moves the operation button 3Y in the restore direction, and the pressed state of the switch 18 by the coupling shaft 36 is released (see FIG. 23). When the operation button 3Y is moved in the restore direction, the engagement protrusion 37 of the operation button 3Y is again engaged with restricting protrusions 11*a*, and the state returns to the state before the operation button 3Y is operated.

As described above, in the sound output device 1Y, the annular sheet member 39 is disposed between the pressed portion 19 and the overhanging portion 11, and the outer peripheral portion 39*c* of the sheet member 39 is joined to the pressed portion 19 while the inner peripheral portion 39*a* is joined to the overhanging portion 11.

Therefore, since the sheet member 39 is joined to the pressed portion 19 and the overhanging portion 11 in a state of being disposed between the pressed portion 19 and the control circuit board 15, it is possible to ensure high waterproofness while reducing the size of the sound output device 1 by effectively using a space. In particular, since the sheet member 39 is joined to the pressed portion 19 and the overhanging portion 11, the effect of preventing entry of moisture into the arrangement space 2*a* is high, so that high waterproofness in the sound output device 1Y can be secured.

Furthermore, in the sound output device 1Y, the sheet member 39 having a small thickness is used to secure the waterproof property, so that the space for disposing the member for securing the waterproof property can be reduced, and the thickness can be reduced accordingly.

Moreover, the sheet member 39 is made elastically deformable, and the sheet member 39 applies a biasing force in the restore direction to the operation button 3Y.

Therefore, when the pressing operation on the operation button 3Y is released, the operation button 3Y can be restored by the biasing force of the sheet member 39 to the position before being pressed, so that the sheet member 39 functions as a restore spring that restores the operation button 3Y to the original position, and high operability of the operation button 3Y can be secured while reducing the number of components.

Note that, similarly to the operation button 3X, in a case where the operation button 3Y is configured to be prevented from falling off from the housing 2 by means other than the bayonet coupling, the operation button 3Y can be integrally formed by a single member such as the operation button 3 instead of including two members.

<Present Technology>

The present technology can be configured as follows.

(1)

A sound output device including:

a housing including an arrangement space therein and in which an insertion hole communicating with the arrangement space is formed;

a control circuit board arranged in the arrangement space;

an operation button including a pressed portion having a front surface formed as a pressed surface to be pressed when the operation button is operated and an engagement protrusion protruding from the pressed portion and inserted into the insertion hole; and a flexible printed wiring board on which an antenna pattern is formed, in which the flexible printed wiring board is attached to a back surface of the pressed portion.

(2)

The sound output device according to (1), in which the housing is provided with an annular overhanging portion positioned between the pressed portion and the control circuit board, and between the pressed portion and the overhanging portion, a packing that is in close contact with the flexible printed wiring board and the overhanging portion is disposed.

(3)

The sound output device according to (2), in which the packing is formed in an annular shape.

(4)

The sound output device according to (3), in which the packing is positioned around the engagement protrusion.

(5)

The sound output device according to any one of (2) to (4), in which the packing is made elastically deformable, and to the operation button, a biasing force in a restore direction is applied by the packing, where the restore direction is a direction opposite to a direction in which the operation button is pressed.

(6)

The sound output device according to any one of (1) to (5), in which the flexible printed wiring board is provided with an attached portion attached to the pressed portion and a lead-out portion having a connection portion protruding from the attached portion and connected to a connection terminal of the control circuit board, and in the lead-out portion, a portion between the attached portion and the connection portion is provided as a bent portion having a bent-back shape.

(7)

The sound output device according to (6), in which the attached portion is formed in an annular shape.

(8)

The sound output device according to (6) or (7), in which the lead-out portion protrudes from an inner periphery of the attached portion.

(9)

The sound output device according to any one of (1) to (8), in which the control circuit board includes, as a connection terminal, a spring terminal that has an elastic deformation portion, and the elastic deformation portion is connected to a part of the flexible printed wiring board in a state of being pressed against the part.

(10)

The sound output device according to any one of (1) to (9), in which the housing is provided with an annular overhanging portion positioned between the pressed portion and the control circuit board, between the pressed portion and the overhanging portion, an annular sheet member is disposed, and the sheet member includes an outer peripheral portion joined to the pressed portion and an inner peripheral portion joined to the overhanging portion.

(11)

The sound output device according to (10), in which the sheet member is made elastically deformable, and to the operation button, a biasing force in a restore direction is applied by the sheet member where the restore direction is a direction opposite to a direction in which the operation button is pressed.

(12)

A sound output device including:

a housing including an arrangement space therein and in which an insertion hole communicating with the arrangement space is formed;

a control circuit board arranged in the arrangement space; and an operation button including a pressed portion having a front surface formed as a pressed surface to be pressed when the operation button is operated and an engagement protrusion protruding from the pressed portion and inserted into the insertion hole, in which the pressed portion includes an antenna pattern formed on at least a back surface thereof.

(13)

The sound output device according to (12), in which the housing is provided with an annular overhanging portion positioned between the pressed portion and the control circuit board, and between the pressed portion and the overhanging portion, a packing that is in close contact with the antenna pattern and the overhanging portion is disposed.

(14)

The sound output device according to (13), in which the packing is formed in an annular shape.

(15)

The sound output device according to (14), in which the packing is positioned around the engagement protrusion.

(16)

The sound output device according to any one of (13) to (15), in which the packing is made elastically deformable, and to the operation button, a biasing force in a restore direction is applied by the packing, where the restore direction is a direction opposite to a direction in which the operation button is pressed.

(17)

The sound output device according to any one of (12) to (16), in which the antenna pattern is formed at a position extending from the pressed portion to a tip end surface of the engagement protrusion, the tip end surface of the engagement protrusion in the antenna pattern includes a portion formed as a contact portion, the control circuit board includes, as a connection terminal, a spring terminal including an elastic deformation portion, and the elastic deformation portion is connected to a part of the flexible printed wiring board in a state of being pressed against the part.

(18)

The sound output device according to (12), in which the housing is provided with an annular overhanging portion positioned between the pressed portion and the control circuit board, between the pressed portion and the overhanging portion, an annular sheet member is disposed, and the sheet member includes an outer peripheral portion joined to the pressed portion and an inner peripheral portion joined to the overhanging portion.

(19)

The sound output device according to (18), in which the sheet member is made elastically deformable, to the operation button, a biasing force in a restore direction is applied by the sheet member where the restore direction is a direction opposite to a direction in which the operation button is pressed.

REFERENCE SIGNS LIST

1 Sound output device
2 Housing
2*a* Arrangement space
3 Operation button
11 Overhanging portion
11*c* Insertion hole
15 Control circuit board
17 Spring terminal
17*b* Elastic deformation portion
19 Pressed portion
19*a* Pressed surface
20 Operation shaft
21 Engagement protrusion
22 Flexible printed wiring board
23 Attached portion
24 Lead-out portion
24*a* Connection portion
24*b* Bent portion
25 Antenna pattern
27 Packing
1A Sound output device
25A Antenna pattern
25*c* Contact portion
27A Packing
27B Packing
27C Packing
27D Packing
27E Packing
27F Packing
27G Packing
1X Sound output device
3X Operation button
39 Sheet member
39*a* Inner peripheral portion
39*c* Outer peripheral portion
1Y Sound output device
3Y Operation button

The invention claimed is:

1. A sound output device, comprising:

a housing including:

an arrangement space; and an insertion hole communicating with the arrangement space;

a control circuit board in the arrangement space;

an operation button including:

a pressed portion, having a front surface, as a pressed surface to be pressed when the operation button is operated; and an engagement protrusion that protrudes from the pressed portion and inserted into the insertion hole; and a flexible printed wiring board, wherein an antenna pattern is on the flexible printed wiring board, and the flexible printed wiring board is attached to a back surface of the pressed portion.

2. The sound output device according to claim 1, further comprising: a packing, wherein the housing further includes an annular overhanging portion between the pressed portion and the control circuit board, the packing is in between the pressed portion and the annular overhanging portion, and the packing is in close contact with the flexible printed wiring board and the annular overhanging portion.

3. The sound output device according to claim 2, wherein the packing is in an annular shape.

4. The sound output device according to claim 3, wherein the packing is around the engagement protrusion.

5. The sound output device according to claim 2, wherein the packing is elastically deformable, and to the operation button, a biasing force in a restore direction is applied by the packing, where the restore direction is a direction opposite to a direction in which the operation button is pressed.

6. The sound output device according to claim 1, further comprising a portion, wherein the flexible printed wiring board includes:

an attached portion attached to the pressed portion; and a lead-out portion having a connection portion that protrudes from the attached portion and connected to a connection terminal of the control circuit board, and in the lead-out portion, the portion is between the attached portion and the connection portion as a bent portion having a bent-back shape.

7. The sound output device according to claim 6, wherein the attached portion is in an annular shape.

8. The sound output device according to claim 6, wherein the lead-out portion protrudes from an inner periphery of the attached portion.

9. The sound output device according to claim 1, wherein the control circuit board includes, as a connection terminal, a spring terminal that has an elastic deformation portion, and the elastic deformation portion is connected to a part of the flexible printed wiring board in a state pressed against the part.

10. The sound output device according to claim 1, further includes an annular sheet member, wherein the housing further includes an annular overhanging portion between the pressed portion and the control circuit board, the annular sheet member is between the pressed portion and the annular overhanging portion, and the annular sheet member includes an outer peripheral portion joined to the pressed portion and an inner peripheral portion joined to the annular overhanging portion.

11. The sound output device according to claim 10, wherein the annular sheet member is elastically deformable, and to the operation button, a biasing force in a restore direction is applied by the annular sheet member where the restore direction is a direction opposite to a direction in which the operation button is pressed.

12. A sound output device, comprising:

a housing including:

an arrangement space; and an insertion hole communicating with the arrangement space;

a control circuit board in the arrangement space; and an operation button including:

a pressed portion, having a front surface, as a pressed surface to be pressed when the operation button is operated; and an engagement protrusion that protrudes from the pressed portion and inserted into the insertion hole, wherein the pressed portion includes an antenna pattern on at least a back surface thereof.

13. The sound output device according to claim 12, further comprising a packing, wherein the housing further includes an annular overhanging portion between the pressed portion and the control circuit board, the packing is in between the pressed portion and the annular overhanging portion, and the packing is in close contact with the antenna pattern and the annular overhanging portion.

14. The sound output device according to claim 13, wherein the packing is in an annular shape.

15. The sound output device according to claim 14, wherein the packing is around the engagement protrusion.

16. The sound output device according to claim 13, wherein the packing is elastically deformable, and to the operation button, a biasing force in a restore direction is applied by the packing, where the restore direction is a direction opposite to a direction in which the operation button is pressed.

17. The sound output device according to claim 12, wherein the antenna pattern is at a position extending from the pressed portion to a tip end surface of the engagement protrusion, the tip end surface of the engagement protrusion in the antenna pattern includes a portion as a contact portion, the control circuit board includes, as a connection terminal, a spring terminal including an elastic deformation portion, and the elastic deformation portion is connected to a part of the antenna pattern in a state of pressed against the part.

18. The sound output device according to claim 12, further includes an annular sheet member, wherein the housing further includes an annular overhanging portion between the pressed portion and the control circuit board, the annular sheet member is between the pressed portion and the annular overhanging portion, and the annular sheet member includes an outer peripheral portion joined to the pressed portion and an inner peripheral portion joined to the annular overhanging portion.

19. The sound output device according to claim 18, wherein the annular sheet member is made elastically deformable, and to the operation button, a biasing force in a restore direction is applied by the annular sheet member where the restore direction is a direction opposite to a direction in which the operation button is pressed.

* * * * *